(12) United States Patent
Takase et al.

(10) Patent No.: US 8,386,575 B2
(45) Date of Patent: Feb. 26, 2013

(54) METHOD OF REALIZING UNIQUENESS ASSURANCE AND METHOD OF DETERMINING MESSAGE DESTINATION

(75) Inventors: Masaaki Takase, Kawasaki (JP);
Makoto Kubota, Kawasaki (JP);
Kenichi Abiru, Kawasaki (JP);
Kazumine Matoba, Kawasaki (JP);
Kouichirou Amemiya, Kawasaki (JP);
Hitoshi Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 300 days.

(21) Appl. No.: 12/723,022

(22) Filed: Mar. 12, 2010

(65) Prior Publication Data
US 2010/0241715 A1   Sep. 23, 2010

(30) Foreign Application Priority Data

Mar. 19, 2009 (JP) ................................ 2009-68959
Jun. 22, 2009 (JP) ............................... 2009-147191

(51) Int. Cl.
*G06F 15/16* (2006.01)
(52) U.S. Cl. ...................................................... 709/206
(58) Field of Classification Search ................... 709/206
See application file for complete search history.

(56) References Cited

U.S. PATENT DOCUMENTS

| | | | | |
|---|---|---|---|---|
| 6,473,802 B2 * | 10/2002 | Masters | ........................ | 709/229 |
| 6,598,077 B2 * | 7/2003 | Primak et al. | ................. | 709/219 |
| 6,658,473 B1 * | 12/2003 | Block et al. | ................... | 709/226 |
| 6,922,724 B1 * | 7/2005 | Freeman et al. | ............. | 709/223 |
| 6,938,031 B1 * | 8/2005 | Zoltan et al. | ................... | 707/771 |
| 7,107,348 B2 * | 9/2006 | Shimada et al. | ............... | 709/229 |
| 7,143,169 B1 * | 11/2006 | Champagne et al. | ......... | 709/226 |
| 7,155,722 B1 * | 12/2006 | Hilla et al. | ..................... | 718/105 |
| 7,272,640 B1 * | 9/2007 | Kazemi et al. | ................. | 709/218 |
| 7,401,114 B1 * | 7/2008 | Block et al. | ................... | 709/203 |
| 7,509,424 B2 * | 3/2009 | Okazaki | ........................ | 709/226 |
| 7,649,876 B2 * | 1/2010 | Berg | ............................. | 370/352 |

(Continued)

FOREIGN PATENT DOCUMENTS

| | | |
|---|---|---|
| JP | 2004-247916 | 9/2004 |
| JP | 2007-219608 | 8/2007 |

(Continued)

OTHER PUBLICATIONS

Anders Kristensen. "SIP Servlet API Version 1.0" Dynamicsoft Inc., Feb. 4, 2003.

*Primary Examiner* — Jerry Dennison
(74) *Attorney, Agent, or Firm* — Katten Muchin Rosenman LLP

(57) ABSTRACT

A method of realizing uniqueness assurance includes: selecting a server to which a first message is to be transferred from multiple servers and transferring the first message to the selected server when the first message is received from a terminal apparatus by a load sharing apparatus; storing a second message that should be transferred to the same server as that of the first server when the second message is received from the terminal apparatus by the load sharing apparatus after the first message is transferred; generating uniqueness assurance information corresponding to the communication protocols corresponding to a session generated by the server to which the first message is transferred, the uniqueness assurance information indicating the correspondence between the session and the message corresponding to the session; and transferring the second message in accordance with the generated uniqueness assurance information if the stored second message exits.

6 Claims, 22 Drawing Sheets

U.S. PATENT DOCUMENTS

| | | | |
|---|---|---|---|
| 7,702,947 B2* | 4/2010 | Peddada | 714/4.1 |
| 7,836,332 B2* | 11/2010 | Hara et al. | 714/5.11 |
| 7,881,325 B2* | 2/2011 | Cheethirala et al. | 370/422 |
| 2002/0032777 A1* | 3/2002 | Kawata et al. | 709/226 |
| 2002/0143955 A1* | 10/2002 | Shimada et al. | 709/227 |
| 2005/0055435 A1* | 3/2005 | Gbadegesin et al. | 709/224 |
| 2006/0130133 A1* | 6/2006 | Andreev et al. | 726/11 |
| 2006/0242300 A1* | 10/2006 | Yumoto et al. | 709/226 |
| 2007/0121596 A1* | 5/2007 | Kurapati et al. | 370/356 |
| 2007/0192492 A1* | 8/2007 | Okazaki | 709/226 |
| 2010/0057829 A1* | 3/2010 | Sedlacek | 709/202 |
| 2010/0088417 A1* | 4/2010 | Amemiya et al. | 709/227 |
| 2010/0241715 A1* | 9/2010 | Takase et al. | 709/206 |
| 2010/0268623 A1* | 10/2010 | Barth et al. | 705/27 |
| 2012/0072588 A1* | 3/2012 | Kamath et al. | 709/224 |

FOREIGN PATENT DOCUMENTS

JP     2008-59060     3/2008

\* cited by examiner

FIG. 9

```
[UNIQUE HEADER INDICATING AUTONOMOUS LOAD SHARING]
SEQUENCE NUMBER : xx

[ORIGINAL MESSAGE RECEIVED BY SECONDARY SLB]
<SOAP-header>
       :
PROTOCOL : SOAP/HTTP
       :
</SOAP-header>
<SOAP-body>
       :
           <presentity>allice@ps.com</presentity>
       :
</SOAP-body>
```

FIG. 10

[UNIQUE HEADER INDICATING AUTONOMOUS LOAD SHARING]
SEQUENCE NUMBER : xx

[ORIGINAL MESSAGE RECEIVED BY SECONDARY SLB]
(sip-header)
PROTOCOL : SIP
       :
To: allice@ps.com
       :
(sip-body)
       :
       :

FIG. 11

MESSAGE TYPE: SESSION CREATION NOTIFICATION
SEQUENCE NUMBER : xx
APPLICATION IDENTIFIER : Presence1
SESSION IDENTIFIER : allice@ps.com

FIG. 12

MESSAGE TYPE: SESSION CREATION NOTIFICATION
SEQUENCE NUMBER : xx
PROTOCOL TYPE : SIP
    IDENTIFICATION RULE IDENTIFIER : Presence1-SIP
    SESSION IDENTIFIER : allice@ps.com
PROTOCOL TYPE : SOAP
    IDENTIFICATION RULE IDENTIFIER : Presence1-SOAP
    SESSION IDENTIFIER : allice@ps.com
    :
    :

FIG. 13

| RULE NUMBER | IDENTIFICATION RULE IDENTIFIER | SESSION IDENTIFIER |
|---|---|---|
| 1 | Presence1-SIP | allice@ps.com |
| 2 | Presence1-SOAP | allice@ps.com |

FIG. 14

| PROCESS NUMBER | IDENTIFICATION RULE IDENTIFIER | SESSION IDENTIFIER |
|---|---|---|
| 1 | Presence1-SIP | allice@ps.com |
| 1 | Presence1-SOAP | allice@ps.com |
| 2 | Presence2-SIP | sensor1@ps.com |
| 3 | Presence2-SIP | sensor2@ps.com |

FIG. 21A

```
PROTOCOL : SIP
    :
To: allice@ps.com
    :
(sip-body)
    :
```

FIG. 21B

```
PROTOCOL : SOAP/HTTP
    :
<SOAP-body>
    :
        <presentity>allice@ps.com</presentity>
    :
</SOAP-body>
```

FIG. 22A

PROTOCOL : SIP
　　　⋮
Join: 0123@kaigi.com
　　　⋮
(sip-body)
　　　⋮

FIG. 22B

PROTOCOL : SOAP/HTTP
　　　⋮
<SOAP-body>
　　　⋮
　　　<session-id>0123@kaigi.com</session-id>
　　　⋮
</SOAP-body>

FIG. 23

| PROTOCOL | MESSAGE TYPE | POSITION OF SESSION IDENTIFIER |
|---|---|---|
| SOAP | TO IP#1_soap | presentity |
| SIP | TO IP#1_sip | To |
| SOAP | TO IP#2_soap | session-id |
| SIP | TO IP#2_sip | Join |

FIG. 24

| VIRTUAL IP | SERVER (IP OF EACH SERVER, ETC.) |
|---|---|
| VIRTUAL IP#2_soap | SERVERS #4, 5, AND 6 |
| VIRTUAL IP#2_sip | SERVERS #4, 5, AND 6 |

FIG. 25A

BEFORE REGISTRATION OF UNIQUENESS ASSURANCE INFORMATION

| VIRTUAL IP OF DESTINATION APPLICATION | SESSION IDENTIFIER | SERVER ADDRESS |
|---|---|---|
| | | |

FIG. 25B

AFTER REGISTRATION OF UNIQUENESS ASSURANCE INFORMATION

| VIRTUAL IP OF DESTINATION APPLICATION | SESSION IDENTIFIER | SERVER ADDRESS |
|---|---|---|
| VIRTUAL IP#1_soap | allice@ps.com | IP ADDRESS #1 |
| VIRTUAL IP#1_sip | allice@ps.com | IP ADDRESS #1 |
| VIRTUAL IP#2_soap | 0123@kaigi.com | IP ADDRESS #4 |
| VIRTUAL IP#2_sip | 0123@kaigi.com | IP ADDRESS #4 |

METHOD OF REALIZING UNIQUENESS ASSURANCE AND METHOD OF DETERMINING MESSAGE DESTINATION

CROSS-REFERENCE TO RELATED APPLICATION

This application is based upon and claims the benefit of priority from the prior Japanese Patent Applications Nos. 2009-68959 filed on Mar. 19, 2009 and 2009-147191 filed on Jun. 22, 2009, the entire contents of which are incorporated herein by reference.

BACKGROUND

1. Field

The present invention relates to a technology to realize uniqueness assurance in which related requests from terminal apparatuses are allocated to the same server among multiple servers capable of providing services in accordance with multiple communication protocols.

2. Description of Related Art

Server load balancers (SLBs) are usually used in load sharing for sharing loads among multiple servers. Such an SLB allocates a request (message) from a terminal apparatus, which is a client, to one server, among multiple servers, in accordance with an autonomous allocation algorithm, such as a round robin method. The allocation causes a session, which is a unit of information exchange, to be created in the server. Identification information (for example, a session identifier (ID)) for uniquely identifying the session is assigned to the created session and the identification information is notified to the SLB and the terminal apparatus. The SLB registers the relationship between the identification information and the server that holds the session corresponding to the identification information in a table or the like. The terminal apparatus submits a request with a packet in which the identification information is stored. The SLB refers to the table by using the identification information stored in the header of the packet to allocate the packet to the server that holds the session corresponding to the identification information. In the above manner, the SLB keeps a function of allocating the requests from the same terminal apparatus to the same server during the session. This function is called a uniqueness ensuring function (or a session keeping function).

The identification information is varied depending on the communication protocol. The session ID is used in communication protocols including Hypertext Transfer Protocol (HTTP). The session ID is stored in a set-cookie field or a cookie field in the HTTP header in an HTTP message. A call ID is used as the identification information in Session Initiation Protocol (SIP). The call ID is stored in a call-id field in the SIP header in an SIP message. The call ID is assigned by the terminal apparatus that transmits the SIP message (packet). A combination of a session ID and a server and a combination of a call ID and a server are information for realizing the uniqueness assurance in which messages are allocated to the servers to which the messages should be allocated. Accordingly, such information is hereinafter referred to as "uniqueness assurance information."

For example, in the field of Service Discovery Protocol (SDP) in Next Generation Network (NGN), applications (hereinafter referred to as "coordination applications") capable of requesting services in which multiple communication protocols are combined with each other are provided. The coordination applications include an application capable of displaying call information in accordance with the HTTP after an SIP call is established and an application that controls an SIP call via a Web page. A typical example of the coordination application is Call Schedule on Busy or No Answer (CSBNA) application that can coordinates the SIP with the HTTP. In the coordination application, it is usually necessary to transmit a message through a communication protocol to a server where a session is created through another communication protocol in order to realize the coordination between the communication protocols. Accordingly, it is necessary to realize the uniqueness assurance also in the coordination between the communication protocols. However, the SLB does not support the uniqueness assurance between multiple communication protocols because the SLB selects a server to which a message is allocated for every communication protocol with an autonomous load sharing (automatic allocation) function.

The uniqueness assurance between multiple communication protocols may be realized by generating uniqueness assurance information for other communication protocols supported by the coordination application in response to the creation of a session in the server and registering the uniqueness assurance information about each communication protocol in the SLB. However, with the coordination application, it is necessary to transmit messages in accordance with arbitrary communication protocols from the terminal apparatuses at arbitrary timing. As a result, cases should be supported in which, in addition to a message in accordance with a communication protocol, messages in accordance with the other communication protocols are substantially concurrently transmitted from the terminal apparatus. This is because the messages in accordance with other communication protocols transmitted from the terminal apparatus can reach the SLB before the uniqueness assurance information about each communication protocol is registered in the SLB and the SLB can allocate the messages to arbitrary servers with the automatic allocation function. Consequently, in order to certainly realize the uniqueness assurance between multiple communication protocols, that is, the uniqueness assurance supporting the coordination between the multiple communication protocols, it is important to support the cases in which messages in accordance with multiple communication protocols are substantially concurrently transmitted from the terminal apparatus.

SUMMARY

A method of realizing uniqueness assurance includes: selecting a server to which a first message is to be transferred from multiple servers and transferring the first message to the selected server when the first message is received from a terminal apparatus by a load sharing apparatus; storing a second message that should be transferred to the same server as that of the first server when the second message is received from the terminal apparatus by the load sharing apparatus after the first message is transferred; generating uniqueness assurance information corresponding to the communication protocols corresponding to a session generated by the server to which the first message is transferred, the uniqueness assurance information indicating the correspondence between the session and the message corresponding to the session; and transferring the second message in accordance with the generated uniqueness assurance information if the stored second message exits.

It is to be understood that both the foregoing summary description and the following detailed description are

BRIEF DESCRIPTION OF THE DRAWINGS

FIG. 9 illustrates an example of the data structure of a SOAP message to which a sequence number is added;

FIG. 10 illustrates an example of the data structure of an SIP message to which a sequence number is added;

FIG. 11 illustrates an example of the data structure of a session creation notification transmitted from the presence server;

FIG. 12 illustrates an example of the data structure of a session creation notification transmitted from the uniqueness-assurance-information setting and managing apparatus;

FIG. 13 illustrates an example of uniqueness assurance information which the second queue monitoring process has for message transfer;

FIG. 14 illustrates exemplary information managed by a queue monitoring process manager;

FIG. 21A illustrates an example of the format of an SIP message when an application #1 is used;

FIG. 21B illustrates an example of the format of a SOAP message when the application #1 is used;

FIG. 22A illustrates an example of the format of an SIP message when an application #2 is used;

FIG. 22B illustrates an example of the format of a SOAP message when an application #2 is used;

FIG. 23 illustrates an example of a uniqueness-assurance-information identification rule;

FIG. 24 illustrates an example of how to set allocation destination candidate server IP addresses;

FIG. 25A illustrates an example of a uniqueness assurance table before the uniqueness assurance information is registered; and FIG. 25B illustrates an example of the uniqueness assurance table after the uniqueness assurance information is registered.

DESCRIPTION OF EMBODIMENTS

First Embodiment

Figure 1:
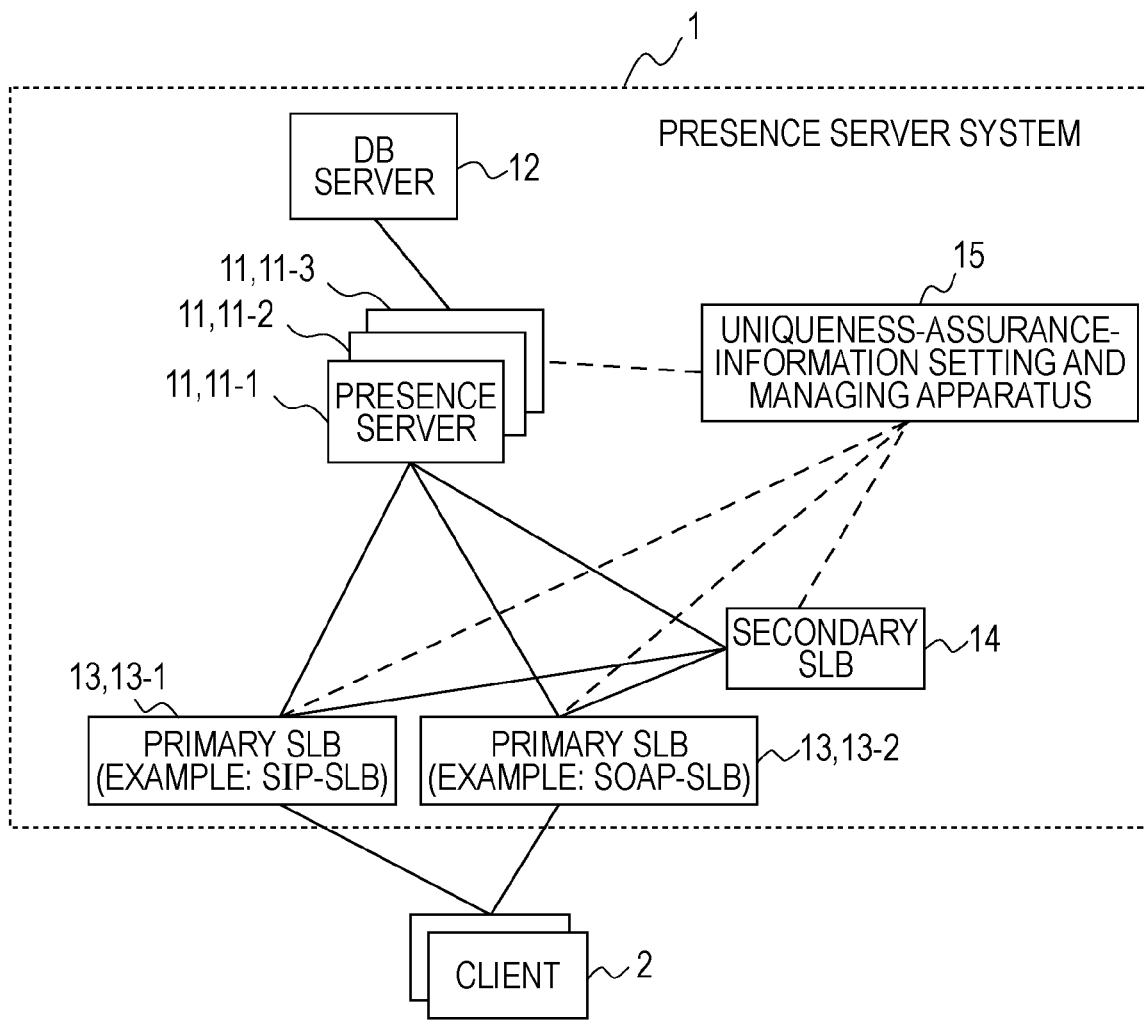
FIG. 1 illustrates an example of the configuration of a network system that is built by using a service providing system according to a first embodiment of the present invention.

FIG. 1 illustrates an example of the configuration of a network system that is built by using a service providing system according to a first embodiment of the present invention. The network system has a configuration in which a presence server system 1, which is the service providing system according to the first embodiment, is connected to each client 2, which is a terminal apparatus, over a communication network. The presence server system 1 (hereinafter abbreviated to the "server system 1") provides to a user of each client 2 a presence service that provides presence information indicating the state of a target person. The state of a target person indicates, for example, whether the person is present, whether the person is on the phone, or whether the person is busy.

The server system 1 includes multiple presence servers 11 each capable of providing the presence service. Each presence server 11 receives a presence state (information) from the client 2 and stores the presence information in a database (DB) server 12. Each presence server 11 inquires the presence information to be transmitted to the client 2 of the DB server 12 to acquire the presence information.

One primary SLB 13, among multiple primary SLBs 13, receives a request (message) transmitted from the client 2. The primary SLB 13 that has received the request transfers the request to one of the presence servers 11 or to a secondary SLB 14. For convenience, it is assumed here that a service providing application installed in the presence server 11 supports the SIP and Simple Object Access Protocol (SOAP) as the communication protocols. In the example in FIG. 1, it is assumed that a primary SLB 13-1 supports the SIP (SIP-SLB) and a primary SLB 13-2 supports the SOAP (SOAP-SLB).

However, the combination of the communication protocols supported by the multiple servers for which the load sharing is performed is not restricted to the above one and a combination other than the combination of the SIP and the SOAP may be supported. In addition, the kind of the service which each server can provide and the combination of the services are not restricted by the combination of the communication protocols.

Each presence server 11 creates a session in response to the reception of the message from the client 2. After creating the session, the presence server 11 notifies a uniqueness-assurance-information setting and managing apparatus 15 of a session identifier, which is the identification information for identifying the session, along with an application identifier, which is the identification information for identifying the application that has created the session.

The combination of the session identifier and the application identifier notified to the uniqueness-assurance-information setting and managing apparatus 15 is used as the uniqueness assurance information indicating a transfer rule used for transferring the message from the client 2 to the presence server 11 to which the message should be transferred. The uniqueness assurance information notified from the presence server 11 corresponds to one communication protocol. Accordingly, the uniqueness-assurance-information setting and managing apparatus 15 generates the uniqueness assurance information for the other communication protocol and notifies each primary SLB 13 and the secondary SLB 14 of the uniqueness assurance information corresponding to the two communication protocols for registration.

The client 2 transmits the message including the session identifier to the primary SLB 13 that is identified by the communication protocol. The primary SLB 13 that has received the message refers to the uniqueness assurance information registered for the communication protocol that is the same as that of the message to determine the destination of the message. If the reference shows that the uniqueness assurance information including the session identifier in the message does not exist, the primary SLB 13 transfers the message to the secondary SLB 14. If the reference shows that the uniqueness assurance information including the session identifier in the message exists, the primary SLB 13 transfers the message to the presence server 11 identified by the application identifier in the uniqueness assurance information. In the above manner, the uniqueness assurance is realized for the message for which the corresponding uniqueness assurance information is registered by the primary SLB 13. All the messages for which the corresponding uniqueness assurance information is not registered are transferred to the secondary SLB 14.

The secondary SLB 14 stores the message transferred from the primary SLB 13 at the end of its queue. The determination of whether the message is allocated with the autonomous load sharing function is based on the uniqueness assurance information registered for the same communication protocol as that of the message and the messages that have been allocated to the presence server 11 with the autonomous load sharing function. The messages that have been allocated with the autonomous load sharing function are considered in order to avoid transferring the message including the same session identifier as that of the message that has been transferred to one presence server 11 to another presence server 11. Accordingly, if multiple messages including the same session identifier are transferred from the primary SLB 13, the secondary SLB 14 allocates only the message that has been first transferred to the presence server 11 determined with the autonomous load sharing function. After the uniqueness assurance information for the messages that are subsequently transferred from the primary SLB 13 is registered, the messages are transferred to the presence servers 11 indicated by the uniqueness assurance information.

In the first embodiment, the secondary SLB 14 processes the messages for which the corresponding uniqueness assurance information is not registered, that is, the messages that should be allocated with the autonomous load sharing function and the messages that are transmitted from the client 2 before the uniqueness assurance information is registered since the above messages have been transferred in the above manner. Consequently, if multiple messages in accordance with multiple communication protocols are transmitted from the clients 2, all the messages including the same session identifier are transferred to the same presence server 11 regardless of the communication protocols. As a result, the uniqueness assurance supporting the coordination between the multiple communication protocols is certainly realized. Consequently, a uniqueness assurance assisting apparatus according to the first embodiment is realized in a manner in which the uniqueness assurance assisting apparatus is installed in the secondary SLB 14.

The secondary SLB 14 adds a sequence number, which is the identification information, to each message allocated with the autonomous load sharing function and transmits the message having the sequence number added thereto to the presence server 11. FIGS. 9 and 10 illustrate examples of the data structures of messages to which the sequence numbers are added. FIG. 9 illustrates an example of the data structure of a SOAP message using the SOAP as the communication protocol. FIG. 10 illustrates an example of the data structure of an SIP message using the SIP as the communication protocol. In the first embodiment, the sequence number added to a message is used for the identification and is also used as information indicating to the presence server 11 that the message is transmitted with the autonomous load sharing function. However, instead of the sequence number, for example, a hash value may be used as such information.

Referring to FIG. 10, "allice@ps.com" described in the SIP header indicates an SIP-Uniform Resource Identifier (URI) of the client 2 that is the destination of the client 2 that has transmitted the message. The destination SIP-URI is stored as a "presentity" parameter in the body (SOAP body) in the SOAP message in FIG. 9. This parameter is information for acquiring the presence information corresponding to the SIP-URI specified as the parameter. In the first embodiment, common information that is stored in messages in accordance with different communication protocols is used as the session identifier.

The destination SIP-URI can be acquired in advance by the user of the client 2 by an arbitrary method. Accordingly, even if messages in accordance with different communication protocols are substantially concurrently transmitted, the destination SIP-URI can be stored in each message. The presence server 11 that has created the session stores the destination SIP-URI as data for the session. Accordingly, the destination SIP-URI serves as information that is useful for identifying the session in the presence server 11. This is the reason why the destination SIP-URI is used as the session identifier. For this reason, the information that can be acquired in advance in the client 2 and that is useful for identifying the session in the presence server 11 should be used as the session identifier. For example, the SIP-URI, the destination, or the Internet Protocol (IP) address of the source client 2 that has transmitted the message can be used as such information.

The presence server 11 that has received the message illustrated in FIG. 9 or FIG. 10 creates a session and then notifies the uniqueness-assurance-information setting and managing apparatus 15 of the creation of the session as a session creation notification. FIG. 11 illustrates an example of the data structure of the session creation notification transmitted from the presence server 11. The session creation notification includes the sequence number in the message, in addition to the uniqueness assurance information including the session identifier indicating the destination SIP-URI in the message serving as a trigger of the creation of the session and the application identifier (indicated as "Presence1" in FIG. 11) indicating the application being executed by the presence server 11 that has created the session.

The uniqueness assurance information included in the session creation notification corresponds to one communication protocol. Accordingly, the uniqueness-assurance-information setting and managing apparatus 15 generates the uniqueness assurance information corresponding to the other communication protocol in response to the reception of the session creation notification and transmits the generated uniqueness assurance information, in addition to the session creation notification, to the secondary SLB 14 and each primary SLB 13. FIG. 12 illustrates an example of the data structure of the session creation notification transmitted from the uniqueness-assurance-information setting and managing apparatus 15 in the above manner. As illustrated in FIG. 12, the session creation notification includes the uniqueness assurance information for every communication protocol.

The uniqueness assurance information is used as an identification rule for identifying the presence server 11 to which the message should be transferred in each primary SLB 13 and the secondary SLB 14. In the first embodiment, in order to identify each identification rule, the secondary SLB 14 adds type information specific to each communication protocol to the application identifier. Referring to FIG. 12, "SIP" and "SOAP" subsequent to "Presence1-" correspond to the added type information. The application identifier to which such information is added is hereinafter referred to as an "identification rule identifier". The uniqueness assurance information is hereinafter also referred to as the "identification rule" or the "transfer rule".

The secondary SLB 14 identifies the message that has been allocated with the autonomous load sharing function by the sequence number included in the session creation notification. If a message including the session identifier included in the message exists in the queue, the secondary SLB 14 reads out the message from the queue and transfers the readout message to the presence server 11 identified by the uniqueness assurance information. Consequently, all the messages that have been transferred to the secondary SLB 14 and that include the same session identifier are transferred to the same presence server 11. As a result, the uniqueness assurance of the messages transmitted from the clients 2 in the situation in which the uniqueness assurance information does not exist is certainly realized.

The configuration and operation of each of the primary SLB 13, the secondary SLB 14, the presence server 11, and the uniqueness-assurance-information setting and managing apparatus 15 will be described with reference to FIGS. 2 to 5.

Figure 2:
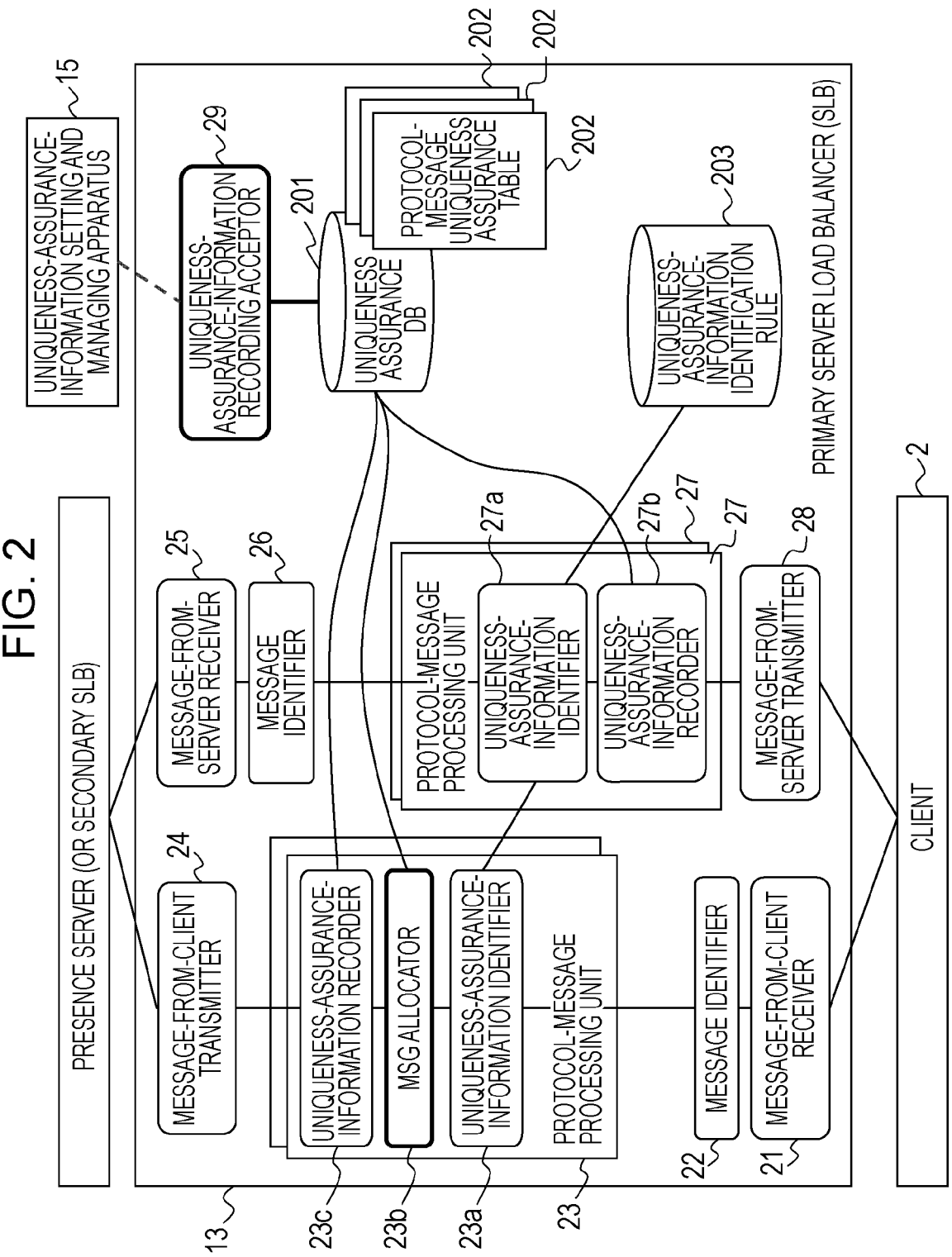
FIG. 2 illustrates an example of the functional configuration of a primary SLB.

FIG. 2 illustrates an example of the functional configuration of the primary SLB 13. The configuration and operation of the primary SLB 13 will now be described in detail with reference to FIG. 2.

Referring to FIG. 2, the primary SLB 13 includes a message-from-client receiver 21, a message identifier 22, protocol-message processing units 23 provided for the respective communication protocols, a message-from-client transmitter 24, a message-from-server receiver 25, a message identifier 26, protocol-message processing units 27 provided for the respective communication protocols, a message-from-server transmitter 28, a uniqueness-assurance-information recording acceptor 29, and a recording device in which a uniqueness assurance DB 201 and a uniqueness-assurance-information identification rule 203 are stored.

A message transmitted from the client 2 is received by the message-from-client receiver 21 and is passed to the message identifier 22 where the communication protocol of the message is identified. The protocol-message processing units 23 for the respective communication protocols are arranged downstream of the message identifier 22. The message identifier 22 passes the message to the corresponding protocol-message processing unit 23 in accordance with the result of the identification.

Each protocol-message processing unit 23 includes a uniqueness-assurance-information identifier 23a, an MSG (message) allocator 23b, and a uniqueness-assurance-information recorder 23c. The uniqueness-assurance-information identifier 23a, the MSG allocator 23b, and the uniqueness-assurance-information recorder 23c operate in the following manners.

The uniqueness-assurance-information identifier 23a identifies and extracts the identification information (the session identifier here) in the uniqueness assurance information existing in the message in accordance with the corresponding communication protocol. The identification is performed with reference to the uniqueness-assurance-information identification rule 203. Information about the position of the identification information (session identifier) in the uniqueness assurance information stored in the manner illustrated in FIG. 9 or FIG. 10 for every communication protocol and for every message is defined in the uniqueness-assurance-information identification rule 203.

The uniqueness assurance DB 201 includes protocol-message uniqueness assurance tables 202 for the respective communication protocols, in which the uniqueness assurance information is stored. The uniqueness assurance information stored in the session creation notification transmitted from the uniqueness-assurance-information setting and managing apparatus 15 is stored (registered) in the corresponding protocol-message uniqueness assurance table 202. The MSG allocator 23b refers to the corresponding protocol-message uniqueness assurance table 202 in the uniqueness assurance DB 201 by using the session identifier identified by the uniqueness-assurance-information identifier 23a to determine the destination of a message. If the uniqueness assurance information including the identified session identifier is registered in the protocol-message uniqueness assurance table 202, the destination is the presence server 11 identified by the uniqueness assurance information. If the uniqueness assurance information including the identified session identifier is not registered in the protocol-message uniqueness assurance table 202, the secondary SLB 14 is determined to be the destination. The transfer of the message to the determined destination is performed by the message-from-client transmitter 24.

The uniqueness-assurance-information recorder 23c stores the identification information about the session in the corresponding protocol-message uniqueness assurance table 202 in the uniqueness assurance DB 201 in accordance with the type of the message. The storage of the identification information is performed only in a situation in which the primary SLB 13 performs the autonomous load sharing for determining the presence server 11 to which the message is allocated. In other words, the storage of the identification information is performed only in a situation in which the transfer of the message to the secondary SLB 14 is not performed.

A message transmitted from the presence server 11 to the primary SLB 13 is received by the message-from-server receiver 25 and the communication protocol of the message is identified by the message identifier 26. As a result, the message is passed to one of the protocol-message processing units 27 for the respective communication protocols (messages).

Each protocol-message processing unit 27 includes a uniqueness-assurance-information identifier 27a and a uniqueness-assurance-information recorder 27b. The uniqueness-assurance-information identifier 27a refers to the uniqueness-assurance-information identification rule 203 to identify (extract) the identification information in the uniqueness assurance information existing in the message. The uniqueness-assurance-information recorder 27b stores the identification information in the protocol-message uniqueness assurance table 202, if necessary. The storage of the identification information by the protocol-message processing unit 27 is performed only in the situation in which the transfer of the message to the secondary SLB 14 is not performed, as in the protocol-message processing unit 23.

The uniqueness assurance information for every communication protocol existing in the session creation notification received from the uniqueness-assurance-information setting and managing apparatus 15 is stored in the uniqueness assurance DB 201 by the uniqueness-assurance-information recorder 23c in the corresponding protocol-message processing unit 23 or by the uniqueness-assurance-information recorder 27b in the corresponding protocol-message processing unit 27. For convenience, it is assumed here that the storage is performed by the uniqueness-assurance-information recorder 27b.

A session creation notification transmitted from the uniqueness-assurance-information setting and managing apparatus 15 is accepted by the uniqueness-assurance-information recording acceptor 29. The uniqueness-assurance-information recording acceptor 29 passes the accepted session creation notification to each protocol-message processing unit 27. The uniqueness-assurance-information recorder 27b in each protocol-message processing unit 27 registers the corresponding uniqueness assurance information in the corresponding protocol-message uniqueness assurance table 202 in the uniqueness assurance DB 201.

The primary SLB 13 determines the destination of the message received from the client 2 in the above manner, transfers the message to the determined destination, and updates the uniqueness assurance DB 201 in response to the session creation notification received from the uniqueness-assurance-information setting and managing apparatus 15. This realizes the uniqueness assurance in which the multiple communication protocols can be coordinated with each other.

The primary SLB 13 includes the protocol-message processing unit 23 and the protocol-message processing unit 27 for every communication protocol to support the multiple communication protocols. Accordingly, it is also possible to support the load sharing using one primary SLB 13.

Figure 3:
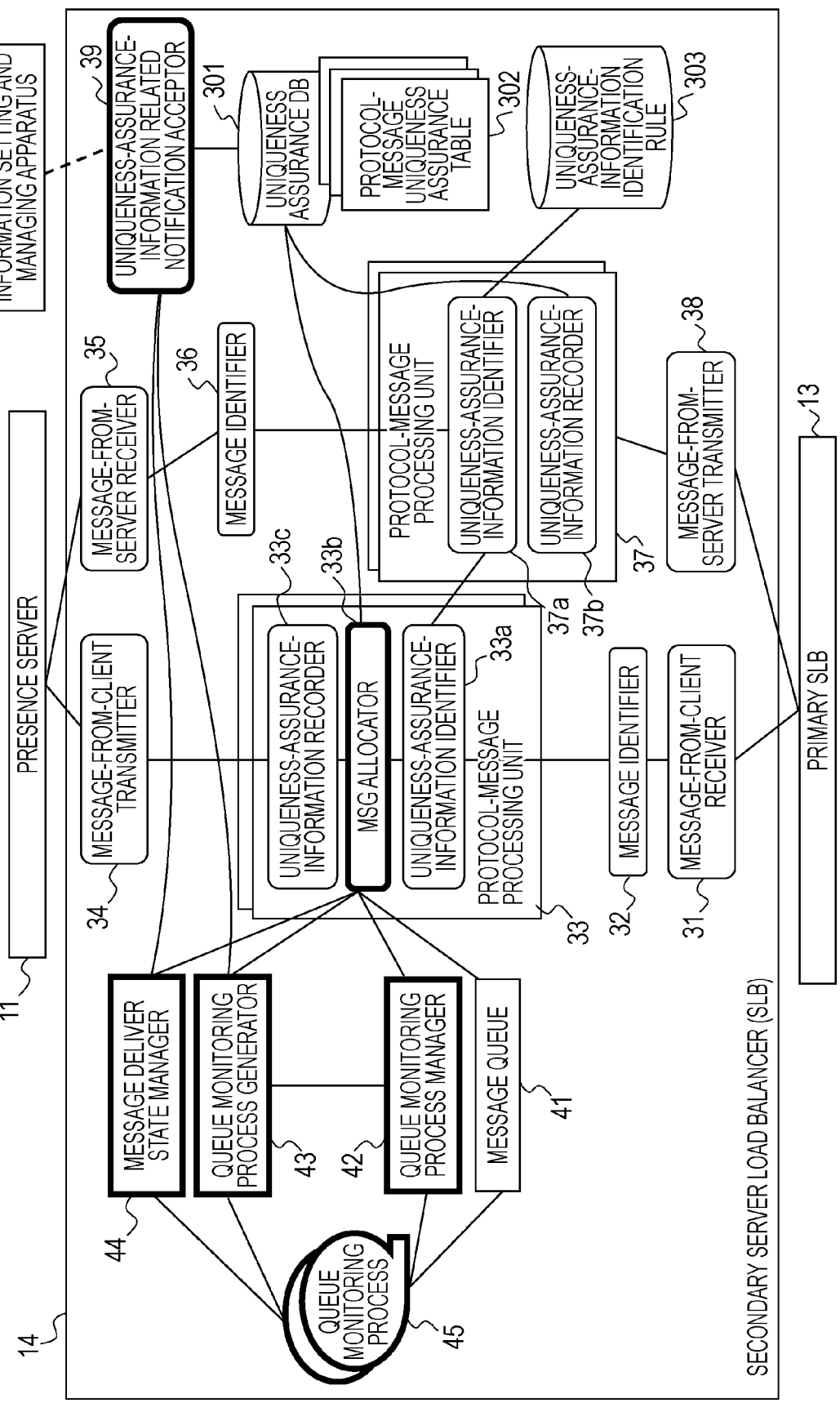
FIG. 3 illustrates an example of the functional configuration of a secondary SLB.

FIG. 3 illustrates an example of the functional configuration of the secondary SLB 14. The configuration and operation of the secondary SLB 14 will now be described in detail with reference to FIG. 3.

Referring to FIG. 3, the secondary SLB 14 includes a message-from-client receiver 31, a message identifier 32, protocol-message processing units 33 provided for the respective communication protocols, a message-from-client transmitter 34, a message-from server receiver 35, a message identifier 36, protocol-message processing units 37 provided for the respective communication protocols, a message-from-server transmitter 38, a uniqueness-assurance-information related notification acceptor 39, a uniqueness assurance DB 301, a uniqueness-assurance-information identification rule 303, a message queue 41, a queue monitoring process manager 42, a queue monitoring process generator 43, and a message delivery state manager 44. Each protocol-message processing unit 33 includes a uniqueness-assurance-information identifier 33a, a MSG allocator 33b, and a uniqueness-assurance-information recorder 33c. Each protocol-message processing unit 37 includes a uniqueness-assurance-information identifier 37a and a uniqueness-assurance-information recorder 37b.

In the above configuration, the operations of the message-from-client receiver 31, the message identifier 32, the protocol-message processing units 33 provided for the respective communication protocols, the message-from-client transmitter 34, the message-from server receiver 35, the message identifier 36, the protocol-message processing units 37 provided for the respective communication protocols, and the message-from-server transmitter 38 are approximately the same as those in the primary SLB 13. Accordingly, only the difference from the primary SLB 13 in the operations of the above components will be described. The uniqueness assurance DB 301 basically has the same content and configuration as those of the uniqueness assurance DB 201 managed by the primary SLB 13 and includes protocol-message uniqueness assurance tables 302 for the respective communication protocols. The uniqueness-assurance-information identification rule 303 also basically has the same content and configuration as those of the uniqueness-assurance-information identification rule 203 managed by the primary SLB 13.

The MSG allocator 33b in each protocol-message processing unit 33 refers to the corresponding protocol-message uniqueness assurance table 302 in the uniqueness assurance DB 301 by using the session identifier identified by the uniqueness-assurance-information identifier 33a to determine the destination of a message. If the uniqueness assurance information including the identified session identifier is registered in the protocol-message uniqueness assurance table 302, the destination is the presence server 11 identified by the uniqueness assurance information. If the uniqueness assurance information including the identified session identifier is not registered in the protocol-message uniqueness assurance table 302, the MSG allocator 33b causes a queue monitoring process 45 generated by the queue monitoring process generator 43 to perform processing.

The cases in which the uniqueness assurance information including the session identifier in the message is not registered are roughly classified into cases in which the message including the session identifier is transferred for the first time and cases in which messages including the same session identifier are transferred after the first message. There are two types of the queue monitoring process 45 generated by the queue monitoring process generator 43: one type is a process only for the autonomous load sharing and the other type is a process in which a message can be transferred in accordance with the uniqueness assurance information. For convenience, the former is hereinafter called a "first queue monitoring process" and the latter is hereinafter called a "second queue monitoring process". The transfer of messages by the first and second queue monitoring processes 45 is performed via the message-from-client transmitter 34.

The MSG allocator 33b stores messages for which the autonomous load sharing by the first queue monitoring process 45 is not performed in the message queue 41. The messages includes the first message depending on the situation. The message queue 41 is a storage device for queuing and the queues are realized by the message queue 41.

The first queue monitoring process 45 selects the presence server 11 that is caused to create the session from the presence servers 11 to transfer the message to the selected presence server 11. The autonomous load sharing is performed regardless of the session identifier in the message. Accordingly, the message in FIG. 9 or FIG. 10, to which the sequence number is added, is transmitted by the first queue monitoring process 45. After the message is transferred, the first queue monitoring process 45 is deleted.

The message delivery state manager 44 is used for managing the messages for which the autonomous load sharing is performed, among the messages stored in the message queue 41. Specifically, the message delivery state manager 44 is a storage device from which data can be read out and in which data can be written and stores at least the sequence number added to the message and the delivery state indicating whether the session creation notification corresponding to the message is received (hereinafter referred to as "delivery state management information") for every message (for example, for every session identifier) transferred to the presence server 11 by the autonomous load sharing. The queue monitoring process 45 refers to, for example, the message delivery state manager 44 to identify the sequence number that should be added to the message to be transferred to the presence server 11 selected by the autonomous load sharing and registers the identified sequence number in the message delivery state manager 44. Data indicating that the reception (notification) of the session creation notification is waited for is registered as the delivery state.

After the message is transferred, the session creation notification is transmitted from the uniqueness-assurance-information setting and managing apparatus 15. The session creation notification is received by the uniqueness-assurance-information related notification acceptor 39 and is passed to the queue monitoring process generator 43. The second queue monitoring process 45, which is generated in response to the passing of the session creation notification to the queue monitoring process generator 43, reads out the message from the message queue 41 in accordance with the uniqueness assurance information included in the session creation notification to transfer the message. The second queue monitoring process 45 is deleted when it is found that no message to be transferred exists in the message queue 41.

Both of the first and second queue monitoring processes 45 are generated, for example, by activating software (applications or subprograms) prepared for the respective first and second queue monitoring processes 45. The second queue monitoring process 45 is activated by, for example, assigning the uniqueness assurance information that should be assigned to the corresponding software. As a result, only the message that should be transferred is transferred in accordance with the assigned uniqueness assurance information.

FIG. 13 illustrates an example of the uniqueness assurance information which the second queue monitoring process 45 has for the message transfer. As illustrated in FIG. 13, the second queue monitoring process 45 assigns rule numbers for identification to the uniqueness assurance information to manage the uniqueness assurance information.

Figure 8:
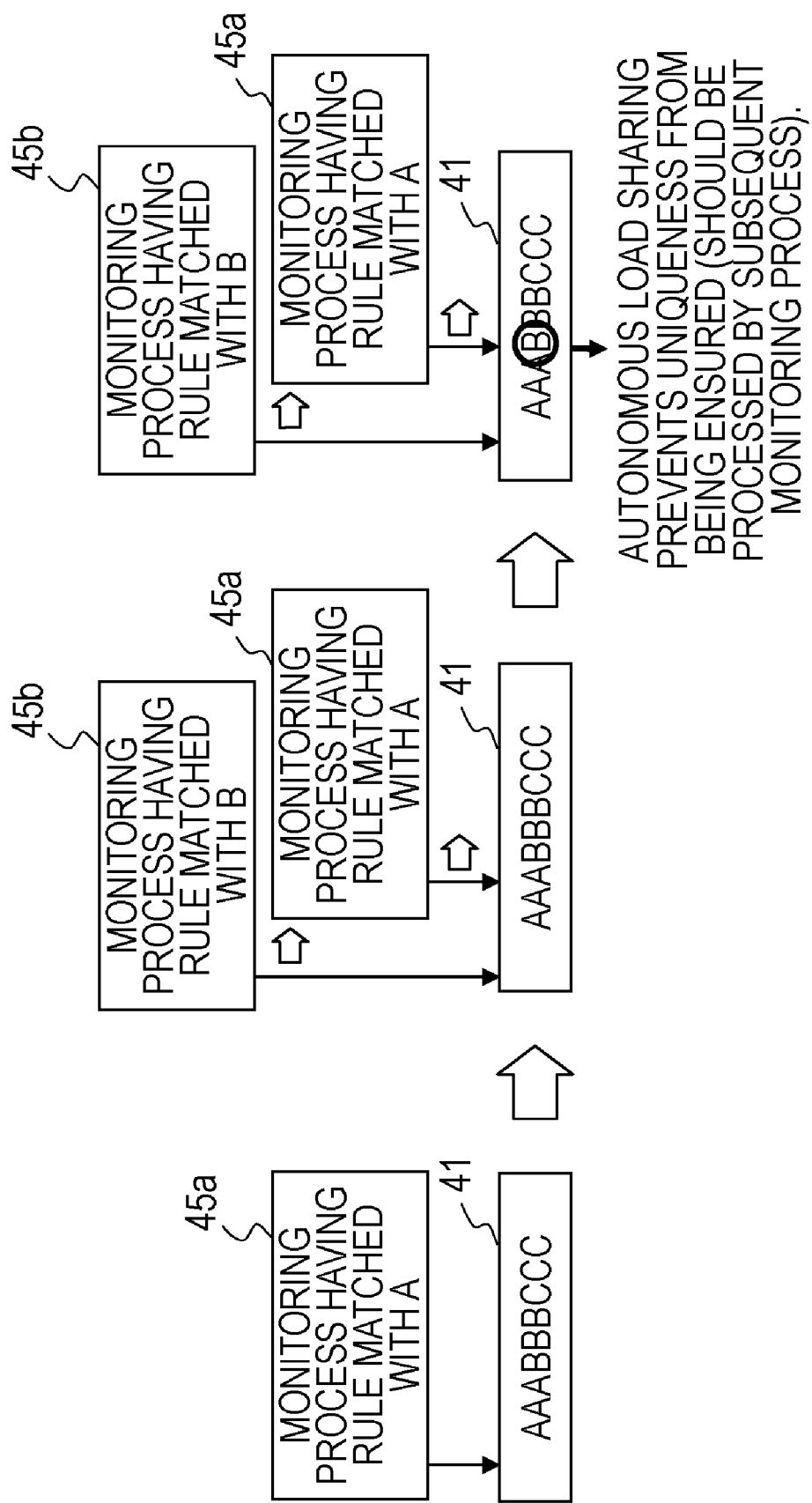
FIG. 8 illustrates an example of how messages are transferred by a second queue monitoring process.

FIG. 8 illustrates an example of how messages are transferred by the second queue monitoring process 45. Referring to FIG. 8, reference letters A to C represent messages that are stored in the message queue 41 and that have different session identifiers. A "monitoring process having a rule matched with A" corresponds to the second queue monitoring process 45 to which the uniqueness assurance information including the session identifier included in the message A is applied. Since the "monitoring process having a rule matched with A" corresponds to the message A, reference numeral "45a" is given to such a second queue monitoring process 45. Similarly, a second queue monitoring process 45b corresponds to the second queue monitoring process 45 to which the uniqueness assurance information including the session identifier included in the message B is applied.

In the first embodiment, as illustrated in FIG. 8, the second queue monitoring process 45 first refers to the beginning of the message queue 41, that is, the message that is first stored to transfer only the corresponding message. Accordingly, for example, the second queue monitoring process 45a reads out only the message A from the message queue 41 to transfer the message A and does not perform the autonomous load sharing for the messages B and C other than the message A. As a result, all the messages stored in the message queue 41 are transferred in accordance with the corresponding uniqueness assurance information.

The second queue monitoring process 45 is generated as the result of the autonomous load sharing. Accordingly, in a situation in which any other second queue monitoring process 45 does not exist, the second queue monitoring process 45 generates the first queue monitoring process 45 before the second queue monitoring process 45 is deleted. In addition, in the above situation, the autonomous load sharing is performed for the first message stored in the message queue 41. After the first message subjected to the autonomous load sharing, any message including the same session identifier is not transferred.

After generating the second queue monitoring process 45, the queue monitoring process generator 43 notifies the queue monitoring process manager 42 of the second queue monitoring process 45 along with the uniqueness assurance information to which a process number for identification assigned to the generated second queue monitoring process 45 is applied. The queue monitoring process manager 42 manages the correspondence between the second queue monitoring process 45 and the uniqueness assurance information applied to the second queue monitoring process 45. The queue monitoring process manager 42 is practically a storage device from which data can be read out and in which data can be written, like the message delivery state manager 44.

FIG. 14 illustrates exemplary information managed by the queue monitoring process manager 42. As illustrated in FIG. 14, the process number is added to the uniqueness assurance information including the identification rule identifier and the session identifier and the uniqueness assurance information having the process number added thereto is stored in the queue monitoring process manager 42. The same process number is assigned to the uniqueness assurance information applied to the same second queue monitoring process 45.

When the session creation notification is received from the uniqueness-assurance-information setting and managing apparatus 15, the uniqueness-assurance-information related notification acceptor 39 passes the session creation notification to the queue monitoring process generator 43 and, for example, to each protocol-message processing unit 37. As a result, the uniqueness assurance information included in the session creation notification is registered in the corresponding protocol-message uniqueness assurance table 302 in the uniqueness assurance DB 301 for every communication protocol. In addition, the uniqueness-assurance-information related notification acceptor 39 identifies the delivery state management information having the sequence number included in the session creation notification from the message delivery state manager 44 and changes the delivery state in the delivery state management information to a state in which the reception of the message is not waited for.

Each component in the secondary SLB 14 operates in the above manner. Accordingly, the uniqueness assurance assisting apparatus according to the first embodiment is mainly realized by the message-from-client receiver 31, the message identifier 32, the protocol-message processing units 33 provided for the respective communication protocols, the message-from-client transmitter 34, the protocol-message processing units 37 provided for the respective communication protocols, the uniqueness-assurance-information related notification acceptor 39, the uniqueness assurance DB 301, the uniqueness-assurance-information identification rule 303, the message queue 41, the queue monitoring process manager 42, the queue monitoring process generator 43, and the message delivery state manager 44.

Although the message for which the corresponding uniqueness assurance information is not registered is processed by the first or second queue monitoring process 45 in the first embodiment, the processing may be performed by one kind of queue monitoring process 45 or three or more kinds of queue monitoring processes 45. Alternatively, the processing may be performed by the MSG allocator 33*b* or another component. Accordingly, the program (uniqueness assurance assisting program) for realizing the secondary SLB 14 may be a program capable of generating the first and second queue monitoring processes 45 or may be a program in which the functions realized by the first and second queue monitoring processes 45 are installed.

Figure 4:
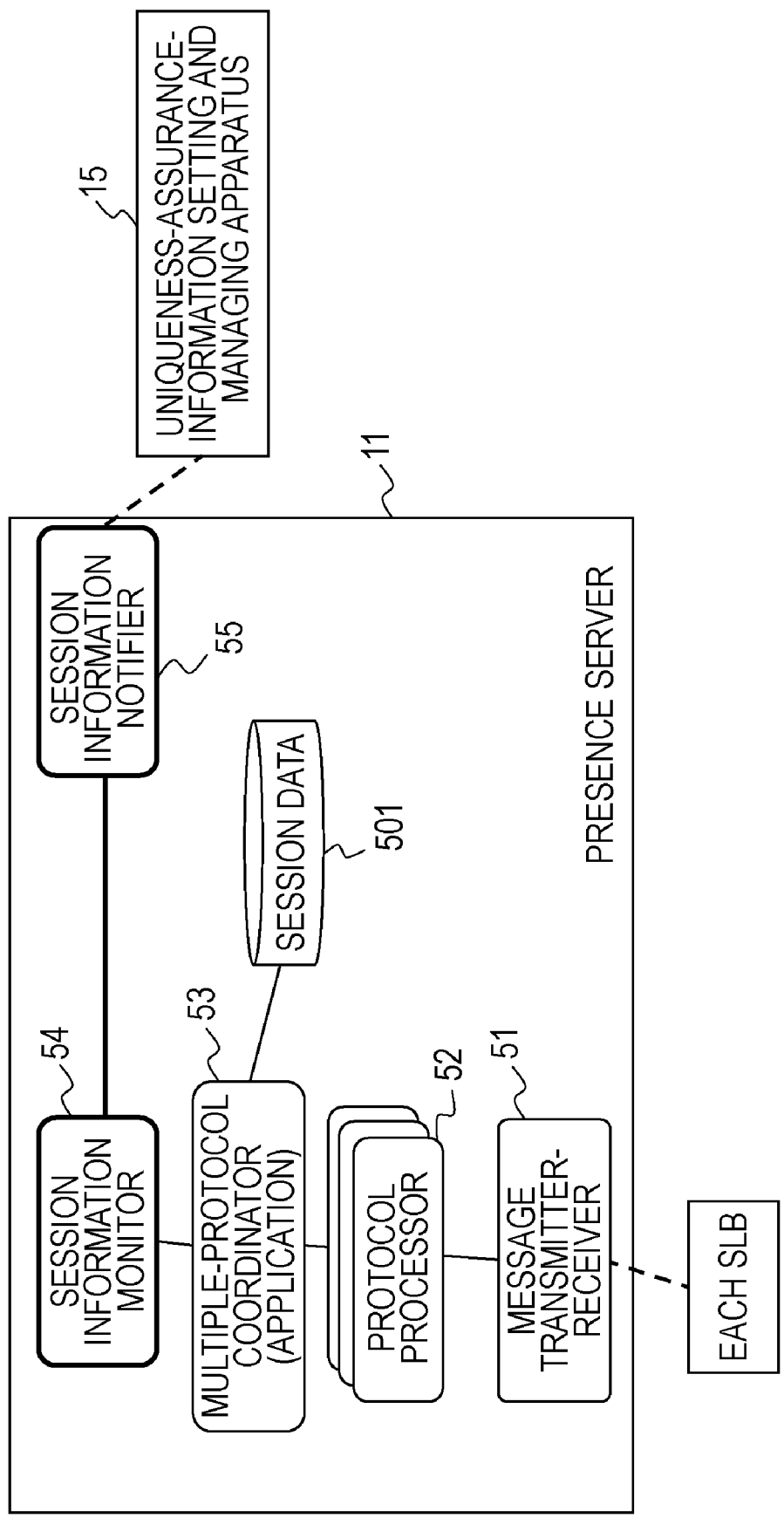
FIG. 4 illustrates an example of the functional configuration of a presence server.

FIG. 4 illustrates an example of the functional configuration of the presence server 11. Referring to FIG. 4, the presence server 11 includes a message transmitter-receiver 51 for transmitting and receiving messages, multiple protocol processors 52 provided for the respective communication protocols, a multiple-protocol coordinator 53, a session information monitor 54, and a session information notifier 55. The multiple-protocol coordinator 53 is realized by an application capable of providing services in accordance with multiple communication protocols. The session information monitor 54 monitors creation of a session by the multiple-protocol coordinator 53. The session information notifier 55 transmits, for example, the session creation notification depending on the result of the monitoring by the session information monitor 54.

Each presence server 11 receives a message transmitted from the primary SLB 13 or the secondary SLB 14 with the message transmitter-receiver 51 and passes the received message to the protocol processor 52 corresponding to the communication protocol of the message. The multiple-protocol coordinator 53, which is arranged downstream of the protocol processors 52, provides a service (the presence service in the example in FIG. 4) in which the multiple communication protocols are coordinated with each other. The protocol processor 52 analyzes the message that is passed and passes the message to the multiple-protocol coordinator 53 to which the message should be passed.

The multiple-protocol coordinator 53 creates a session in response to the message passed from the protocol processor 52 and generates and stores session data 501 concerning the generated session. The session data 501 includes the session identifier for uniquely identifying the session and data associated with the session. The presence information acquired from the DB server 12 is managed as part of the session data 501 and is used for the provision of the presence service.

If the uniqueness assurance causing one presence server 11 to perform the coordination between the multiple protocols is not realized, data items (caches) acquired from the DB server 12 are redundantly stored in each presence server 11 to which the message is transferred for every communication protocol. Accordingly, in such a case, each presence server 11 is required to check whether the original of the DB server 12 is updated in the reference to the data. If the original of the DB server 12 is updated, each presence server 11 is required to acquire new data from the DB server 12. Consequently, the load on each presence server 11 can be likely to be increased to waste a larger amount of resource.

The session information monitor 54 monitors the creation of a session by the multiple-protocol coordinator 53 and, when a session is created, passes information concerning the session, for example, the sequence number, the session identifier, and the application identifier to the session information notifier 55. The session information notifier 55 makes the session creation notification in which the above information is stored and transmits the session creation notification to the uniqueness-assurance-information setting and managing apparatus 15.

The multiple-protocol coordinator 53 deletes the created session if a predetermined condition is met. For example, the multiple-protocol coordinator 53 deletes the session when a predetermined time elapsed since the client 2 has finally transmitted the corresponding message. If the session is deleted, the session information monitor 54 passes the information concerning the session, for example, the session identifier and the application identifier to the session information notifier 55. The session information notifier 55 makes a session deletion notification in which the above information is stored and transmits the session deletion notification to the uniqueness-assurance-information setting and managing apparatus 15.

Figure 5:
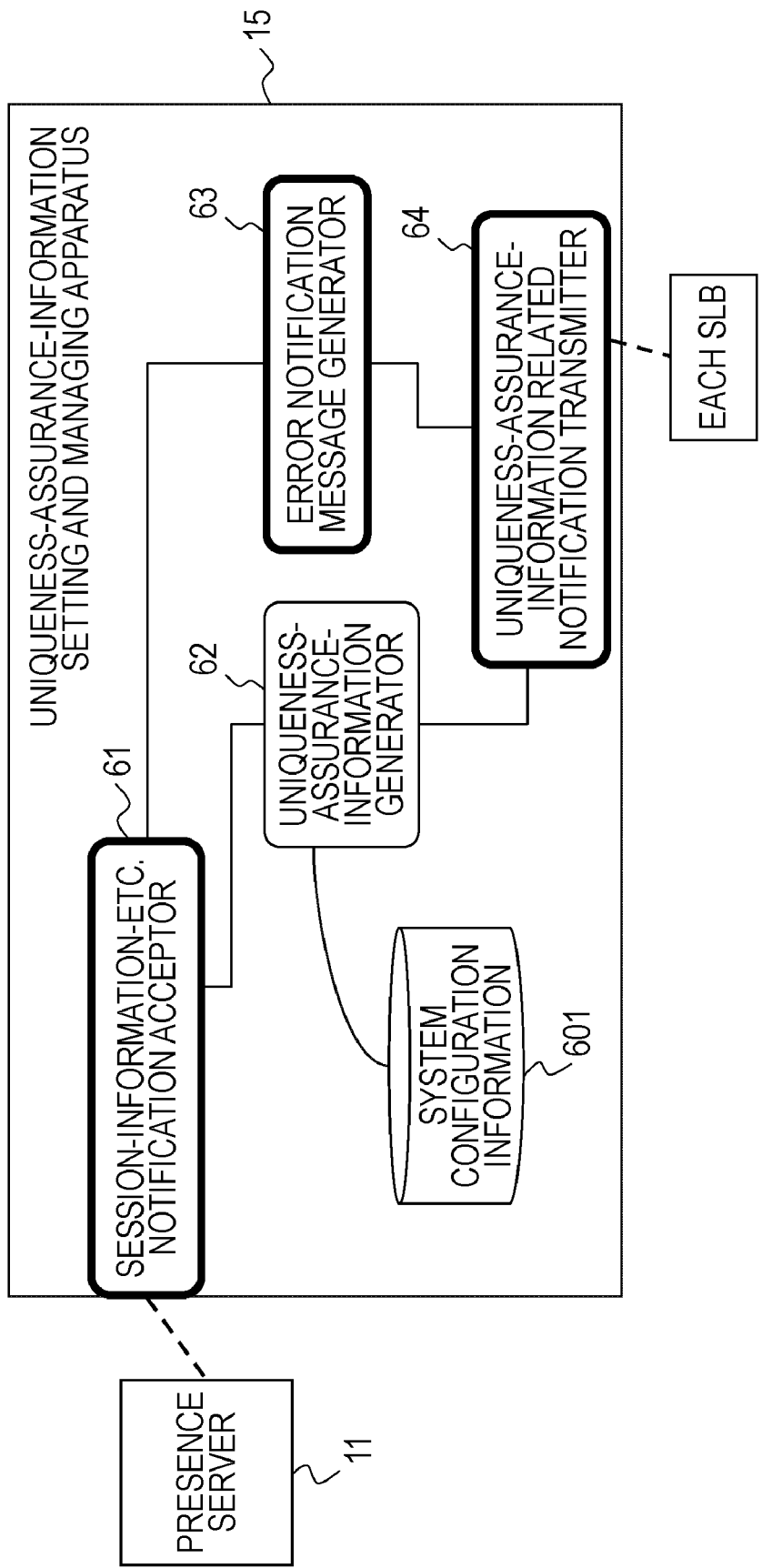
FIG. 5 illustrates an example of the functional configuration of a uniqueness-assurance-information setting and managing apparatus.

FIG. 5 illustrates an example of the functional configuration of the uniqueness-assurance-information setting and managing apparatus 15. Referring to FIG. 5, the uniqueness-assurance-information setting and managing apparatus 15 includes a session-information—etc. notification acceptor 61, a uniqueness-assurance-information generator 62, an error notification message generator 63, and a uniqueness-assurance-information related notification transmitter 64.

The uniqueness-assurance-information setting and managing apparatus 15 receives various notifications (messages) transmitted from the presence servers 11 with the session-information—etc. notification acceptor 61. Each notification that is received is passed to the uniqueness-assurance-information generator 62 and the error notification message generator 63. If the notification that is passed is the session creation notification, the uniqueness-assurance-information generator 62 adds the type information indicating the communication protocol corresponding to the application identifier in the uniqueness assurance information included in the session creation notification. In addition, the uniqueness-assurance-information generator 62 identifies the communication protocol used in the generation of the uniqueness assurance information from the application identifier and generates the uniqueness assurance information for the identified communication protocol. The uniqueness-assurance-information generator 62 stores the generated uniqueness assurance information in the session creation notification. As a result, the uniqueness-assurance-information generator 62 makes, for example, the session creation notification illustrated in FIG. 12 and refers to system configuration information 601 to determine the destination of the session creation notification that is made.

The system configuration information 601 includes identification information for uniquely identifying each primary SLB 13 and the secondary SLB 14 upstream of the presence server 11, for example, the addresses of each primary SLB 13 and the secondary SLB 14. The uniqueness-assurance-information setting and managing apparatus 15 refers to the system configuration information 601 to set each primary SLB 13 and the secondary SLB 14 as the destinations of the session creation notification.

If the notification that is passed is the session deletion notification, the uniqueness-assurance-information generator 62 adds the type information indicating the communication protocol corresponding to the application identifier in the uniqueness assurance information included in the session deletion notification. In addition, the uniqueness-assurance-information generator 62 identifies the communication protocol used in the generation of the uniqueness assurance information from the application identifier and generates the uniqueness assurance information for the identified communication protocol. The uniqueness-assurance-information generator 62 stores the generated uniqueness assurance information in the session deletion notification. As a result, the uniqueness-assurance-information generator 62 makes, for example, the session deletion notification having a structure in which the sequence number is deleted from the session creation notification illustrated in FIG. 12 and refers to the system configuration information 601 to set each primary SLB 13 and the secondary SLB 14 as the destinations of the session deletion notification that is made.

If the notification that is passed is a session non-creation notification indicating that no session is created, the error notification message generator 63 sets the secondary SLB 14 as the destination of the session non-creation notification. The session non-creation notification includes, for example, the sequence number so that the secondary SLB 14 can identify the corresponding message.

The uniqueness-assurance-information related notification transmitter 64 receives the notification to be transmitted from the uniqueness-assurance-information generator 62 or the error notification message generator 63 and transmits the received notification. The registration or deletion of the uniqueness assurance information is performed in each primary SLB 13 and the secondary SLB 14 in response to the transmission.

Although the uniqueness assurance information for the communication protocol that is not included in the session creation notification transmitted from the presence server 11 is generated and added by the uniqueness-assurance-information setting and managing apparatus 15 in the first embodiment, the generation and addition may not be performed. In other words, the presence server 11 may generate the session creation notification illustrated in FIG. 12 by generating the session and may transmit the generated session creation notification to the destination to which the session creation notification should be transmitted. Accordingly, the uniqueness-assurance-information setting and managing apparatus 15 may be installed in each presence server 11. Alternatively, the uniqueness-assurance-information setting and managing apparatus 15 may be installed in one of the presence servers 11 or may be installed in the secondary SLB 14. It is sufficient for the secondary SLB 14 capable of recognizing the creation of the session in the presence server 11 that has received the message to, for example, generate the uniqueness assurance information to be added, transmit multiple pieces of the uniqueness assurance information including the generated uniqueness assurance information to the primary SLBs 13, and register the multiple pieces of the uniqueness assurance information in the uniqueness assurance DB 301. The uniqueness-assurance-information setting and managing apparatus 15 is provided as a dedicated apparatus in order to avoid an increase in the load on each presence server 11 and to avoid an increased amount of necessary resource.

Figure 6:
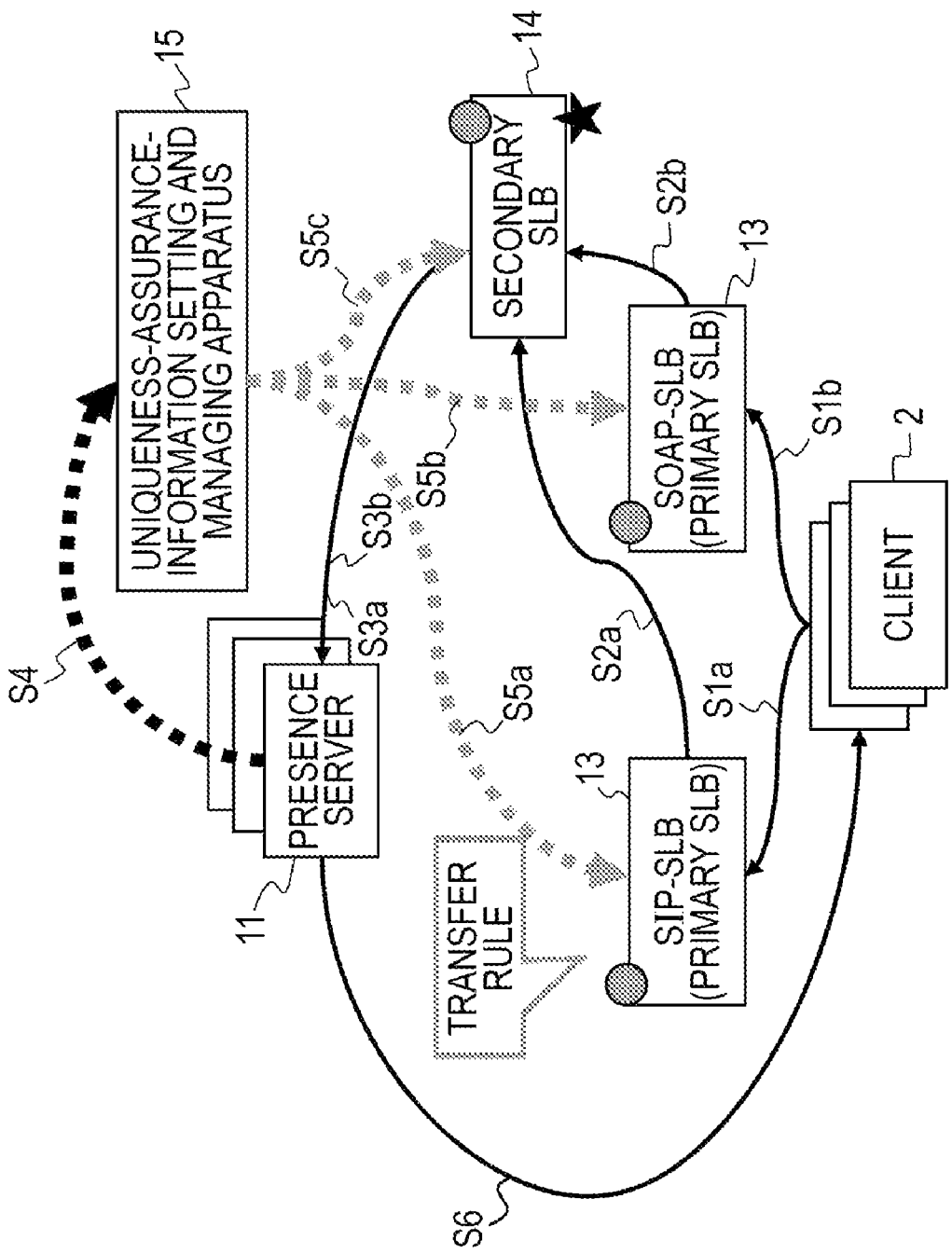
FIG. 6 illustrates an exemplary sequence of the operation by clients, the presence servers, the primary SLBs, the secondary SLB, and the uniqueness-assurance-information setting and managing apparatus.
Figure 7:
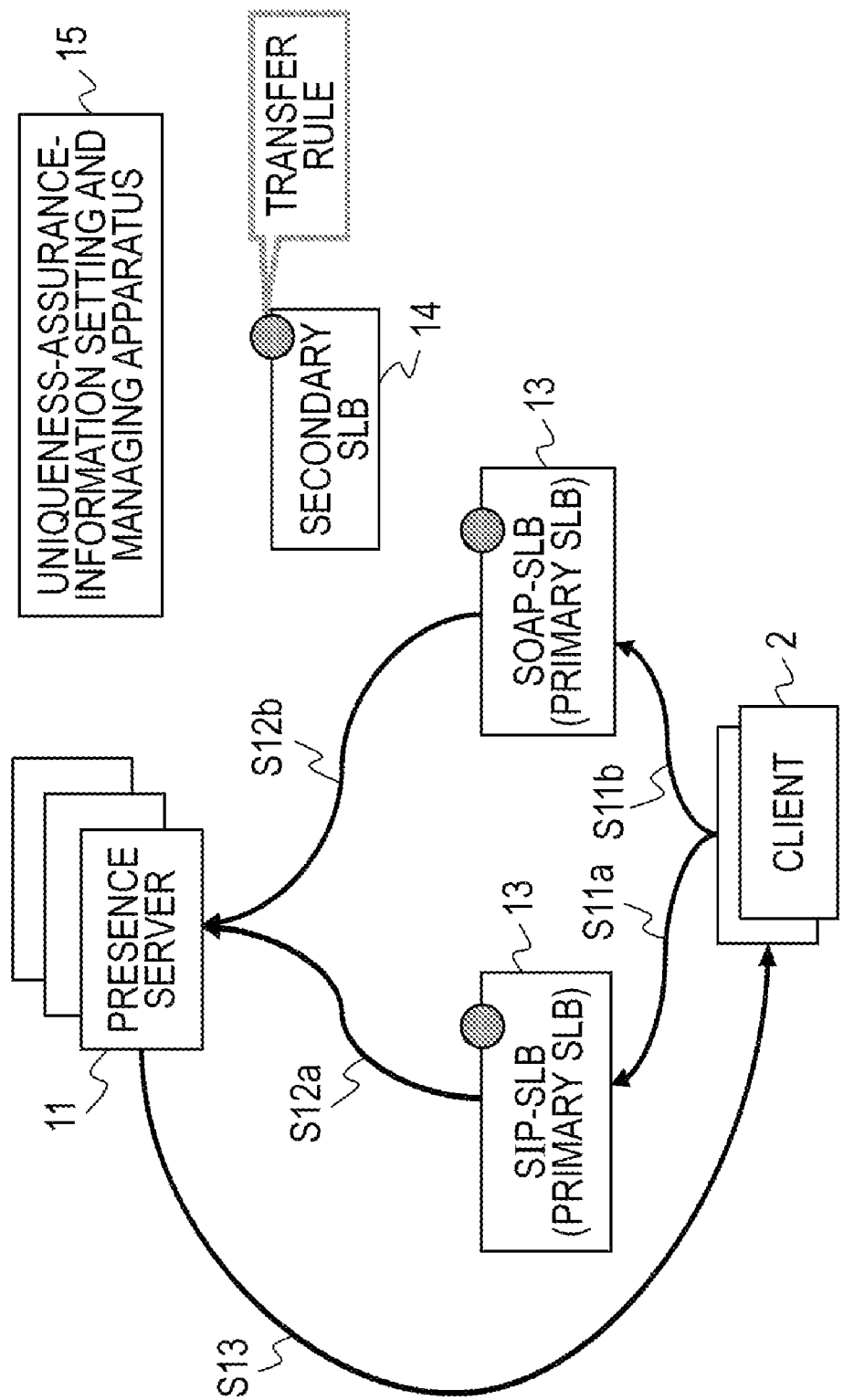
FIG. 7 illustrates another exemplary sequence of the operation by the clients, the presence servers, the primary SLBs, the secondary SLB, and the uniqueness-assurance-information setting and managing apparatus.

FIG. 6 and FIG. 7 illustrate exemplary sequences of the operations by the client 2, the presence servers 11, each primary SLB 13, the secondary SLB 14, and the uniqueness-assurance-information setting and managing apparatus 15. The operations are illustrated by using messages transmitted and received in the network system illustrated in FIG. 1. Solid-line arrows denote messages concerning the presence service and broken-line arrows denote messages concerning the uniqueness assurance information. FIG. 6 illustrates an example of a sequence before the uniqueness assurance information is registered in each primary SLB 13 and the secondary SLB 14 since the client has transmitted the first message. FIG. 7 illustrates an example of a sequence after the uniqueness assurance information is registered.

The network configuration in which the presence servers 11, the DB server 12, the primary SLBs 13, the secondary SLB 14, and the uniqueness-assurance-information setting and managing apparatus 15 composing the presence server system 1 are connected to each other is not specifically restricted. For convenience, it is assumed in FIGS. 6 and 7 that each component in the presence server system 1 is connected to a communication network to which each client 2 can be connected. Accordingly, it is also assumed that each presence server 11 directly transmits a reply to the client 2. It is further assumed that the messages transmitted from the client 2 include the same session identifier even if the messages comply with different communication protocols.

Referring to FIG. 6, in Sequence S1a, the client 2 transmits the first message in accordance with, for example, the SIP. Since the transmitted message is the first message, the corresponding uniqueness assurance information (denoted by the "transfer rule" in FIG. 6) is not registered in each primary SLB 13 and the secondary SLB 14. Accordingly, in Sequence S2a, the first message received by the primary SLB 13 is transferred to the secondary SLB 14. Then, in Sequence S1b, the client 2 transmits a message in accordance with the SOAP. In Sequence S2b, the message is also transferred from the primary SLB 13 to the secondary SLB 14. Such transfer of the messages from the primary SLB 13 to the secondary SLB 14 is performed each time a message is transmitted from the client 2 until the uniqueness assurance information (transfer rule) is registered.

In Sequence S3a, the secondary SLB 14 to which the first message is transferred determines the presence server 11, which is the destination of the message, by the autonomous load sharing and transfers the first message to the destination presence server 11. In Sequence S4, the presence server 11 to which the first message has been transferred creates a session and transmits the session creation notification to the uniqueness-assurance-information setting and managing apparatus 15. In Sequences S5a to S5c, the uniqueness-assurance-information setting and managing apparatus 15 creates a session creation notification to be transmitted to each primary SLB 13 and the secondary SLB 14 from the received session creation notification and transmits the created session creation notification to each primary SLB 13 and the secondary SLB 14.

In Sequence S6, the presence server 11 that has created the session transmits a message to the client 2 from which the first message has been transmitted. In Sequence S3b, the secondary SLB 14, which has received the session creation notification, transfers the message stored in the message queue 41 to the presence server 11 identified by the uniqueness assurance information. The secondary SLB 14 transfers all the messages that have been transferred to the same presence server 11.

Referring to FIG. 7, after the uniqueness assurance information is registered, in Sequence S11a or S11b, each primary SLB 13 receives the corresponding message from the client 2. In Sequence S12a or S12b, each primary SLB 13 transfers the message to the presence server 11 identified by the uniqueness assurance information included in the message. In Sequence S13, the presence server 11 to which the message has been transferred transmits a message for service provision to the client 2.

The secondary SLB 14 executes the program (uniqueness assurance assisting program) to realize the transfer of the above messages. Processes realized by the execution of the uniqueness assurance assisting program will now be described in detail with reference to flowcharts in FIGS. 15 to 17.

Figure 15:
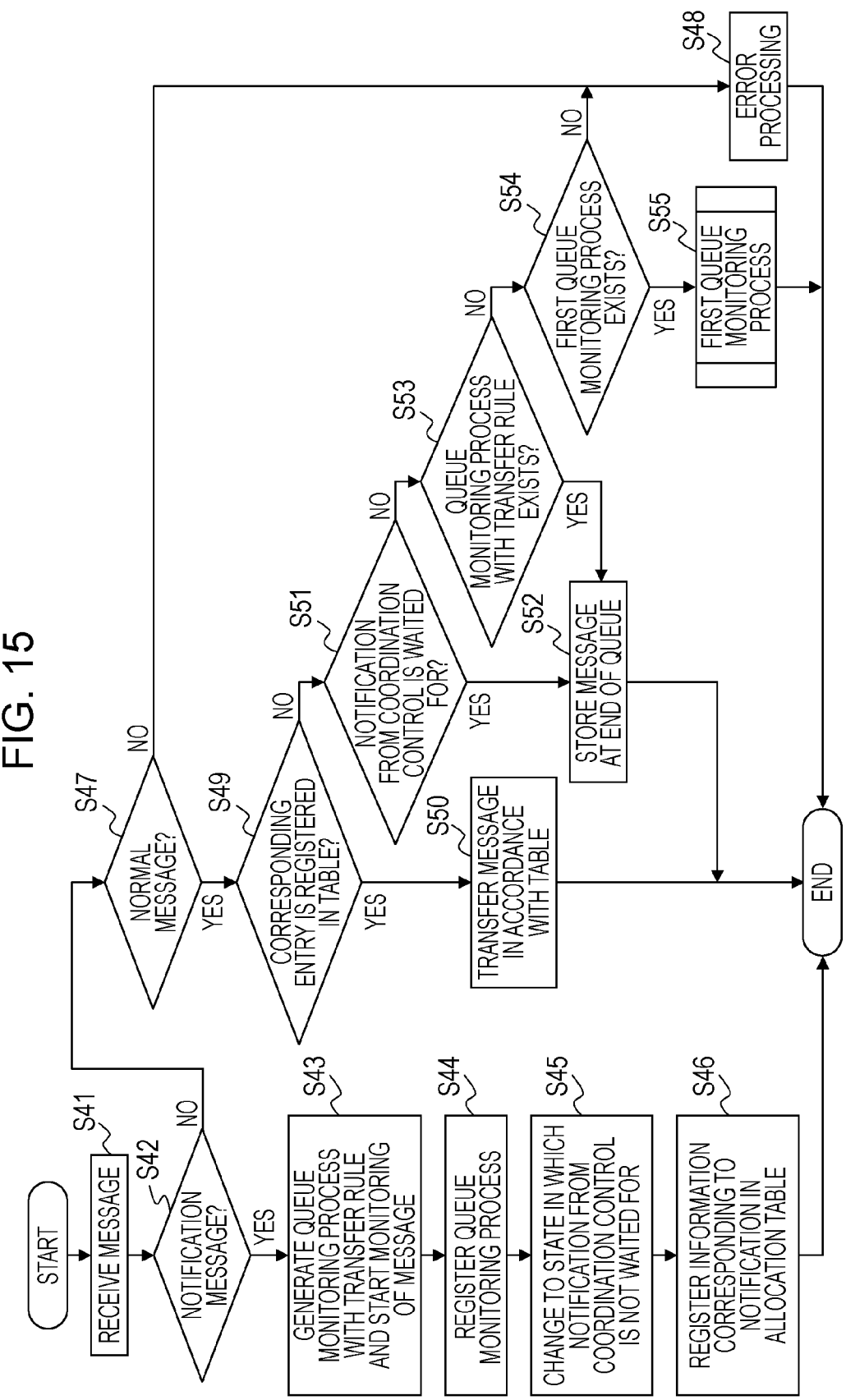
FIG. 15 is a flowchart illustrating an example of a message reception process.

FIG. 15 is a flowchart illustrating an example of a message reception process. This reception process is performed in response to the reception of a message transmitted from the primary SLB 13 or the uniqueness-assurance-information setting and managing apparatus 15. In the message reception process in FIG. 15, steps to be performed are extracted with attention being paid to the MSG allocator 33b, the queue monitoring process generator 43, and the first queue monitoring process 45 and the flow of the extracted steps is illustrated. Attention is paid only to the session creation notification as the message transmitted from the uniqueness-assurance-information setting and managing apparatus 15. The message reception process will now be described in detail with reference to FIG. 15. The uniqueness assurance information assigned to the second queue monitoring process 45 is denoted by the "transfer rule" in FIG. 15.

Referring to FIG. 15, in Step S41, a message is received. In Step S42, the secondary SLB 14 determines whether the received message is a session creation notification. If the secondary SLB 14 determines that the message is a session creation notification having the structure illustrated in FIG. 12, the determination is affirmative and the process goes to Step S43. Otherwise, the determination is negative and the process goes to Step S47.

In Step S43, the secondary SLB 14 generates the second queue monitoring process 45 to which the uniqueness assurance information (transfer rule) included in the received session creation notification is assigned and starts monitoring of the message stored in the message queue 41. In Step S44, the secondary SLB 14 registers the generated queue monitoring process 45. In Step S45, the secondary SLB 14 changes the delivery state of the delivery state management information corresponding to the received session creation notification to the state in which the notification is not waited for. In Step S46, the secondary SLB 14 registers the uniqueness assurance information included in the session creation notification in the corresponding protocol-message uniqueness assurance table 302 (denoted by an "allocation table" in FIG. 15") in the uniqueness assurance DB 301. Then, the message reception process is terminated.

The execution of Steps S43 and S44 realizes the queue monitoring process generator 43 and at least one combination of the process number, the identification rule identifier, and the session identifier is stored in the queue monitoring process manager 42, as illustrated in FIG. 14. The execution of Step S45 realizes the update of the content of the message delivery state manager 44 by the uniqueness-assurance-information related notification acceptor 39. The execution of Step S46 realizes the registration of the uniqueness assurance information in the uniqueness assurance DB 301 by the uniqueness-assurance-information recorder 37b in the corresponding protocol-message processing unit 37.

In Step S47, the secondary SLB 14 determines whether the received message is a normal message, that is, a message transferred from the client 2 through the primary SLB 13. If the secondary SLB 14 determines that the received message is a normal message, the determination is affirmative and the process goes to Step S49. If the secondary SLB 14 determines that the received message is not a normal message, for example, if the received message is a session deletion notification or a session non-creation notification indicating that the session is not created, the determination in Step S47 is negative and the process goes to Step S48. In Step S48, the corresponding processing is performed. Then, the message reception process is terminated.

In Step S49, the secondary SLB 14 determines whether the corresponding entry is registered in the protocol-message uniqueness assurance table 302 corresponding to the communication protocol of the normal message. If the secondary SLB 14 determines that the uniqueness assurance information including the session identifier in the normal message is registered in the corresponding protocol-message uniqueness assurance table 302, the determination is affirmative and the process goes to Step S50. In Step S50, the secondary SLB 14 transfers the normal message in accordance with the uniqueness assurance information. Then, the message reception process is terminated. If the secondary SLB 14 determines that the uniqueness assurance information including the session identifier in the normal message is not registered in the corresponding protocol-message uniqueness assurance table 302, the determination in Step S49 is negative and the process goes to Step S51.

In Step S51, the secondary SLB 14 determines whether the reception of the session creation notification corresponding to the normal message from the uniqueness-assurance-information setting and managing apparatus 15 (denoted by "coordination control" in FIG. 15) is waited for. If the normal message (the first message) including the same session identifier is subjected to the autonomous load sharing before the normal message is received, the delivery state management information about the first message is stored in the storage device realizing the message delivery state manager 44. The delivery state in the delivery state management information is the state in which the reception of a message is waited for. Accordingly, if the delivery state management information corresponding to the normal message is stored and the delivery state is the state in which the reception of a message is waited for, the determination in Step S51 is affirmative and the process goes to Step S52. In Step S52, the secondary SLB 14 stores the normal message at the end of the message queue 41. Then, the message reception process is terminated. If the delivery state management information corresponding to the normal message is not stored or the delivery state is not the state in which the reception of a message is waited for, the determination in Step S51 is negative and the process goes to Step S53.

In Step S53, the secondary SLB 14 determines whether the second queue monitoring process 45 (the queue monitoring process with the transfer rule) exists. If the secondary SLB 14 determines that the second queue monitoring process 45 exists, the determination is affirmative and the process goes to Step S52. In Step S52, the secondary SLB 14 stores the normal message in the message queue 41. If the secondary SLB 14 determines that the second queue monitoring process 45 does not exist, the determination in Step S53 is negative and the process goes to Step S54.

The movement to Step S54 means that the secondary SLB 14 receives the first message in a situation in which the second queue monitoring process 45 does not exist. As described above, in the first embodiment, the second queue monitoring process 45 to be deleted is caused to generate the first queue monitoring process 45 if the second queue monitoring process 45 is to be deleted. Accordingly, in Step S54, the secondary SLB 14 determines whether the first queue monitoring process 45 exists. If the secondary SLB 14 determines that the first queue monitoring process 45 does not exist, the determination is negative and the process goes to Step S48. In Step S48, the secondary SLB 14 performs error processing against the situation in which the first queue monitoring process 45 does not exist. Then, the message reception process is terminated. If the secondary SLB 14 determines that the first queue monitoring process 45 exists, the determination in Step S54 is affirmative and the process goes to Step S55. In Step S55, the secondary SLB 14 gives a central-processing-unit (CPU) control right to the first queue monitoring process 45 to execute the queue monitoring process 45. Then, the message reception process is terminated.

Figure 16:
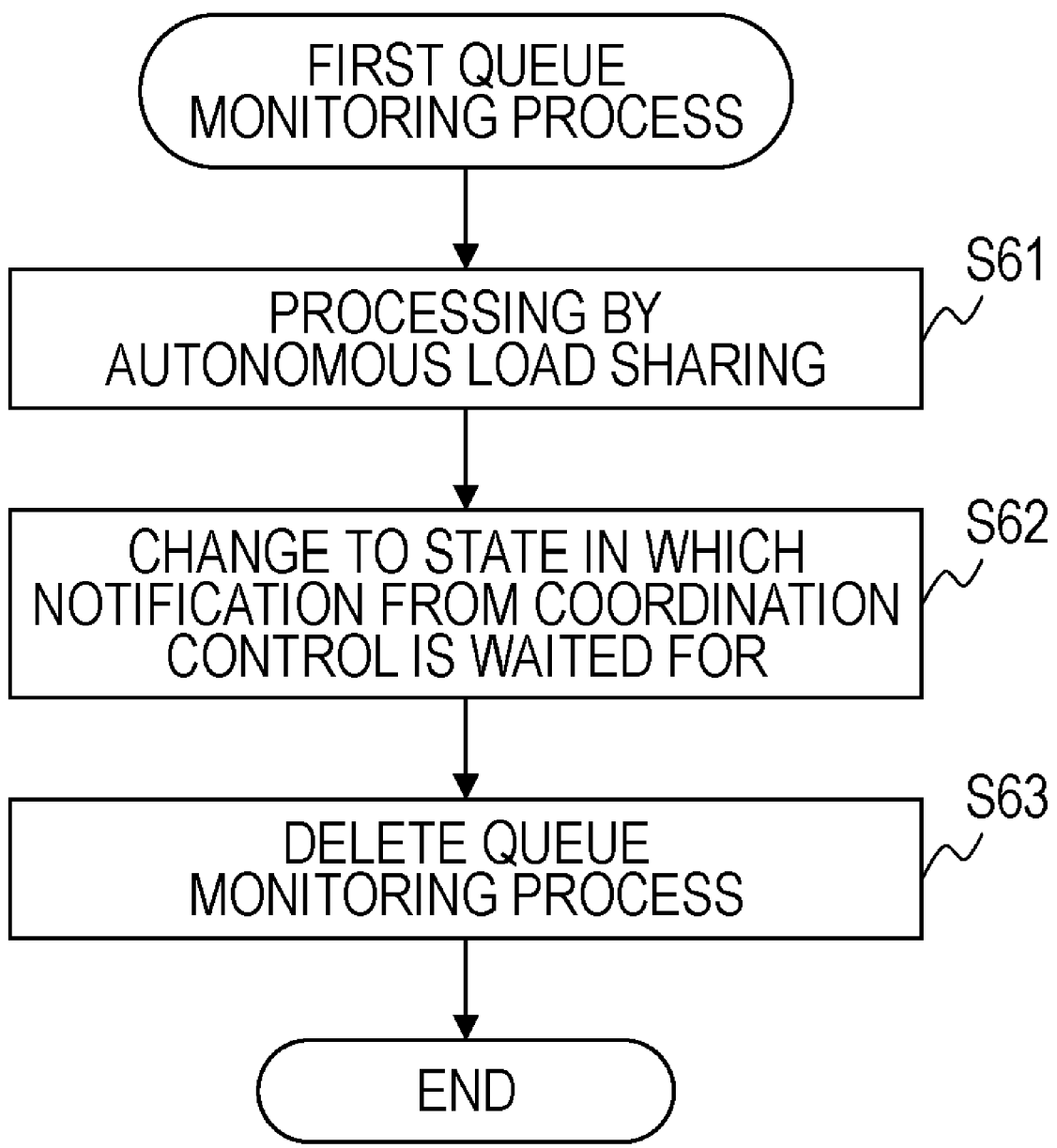
FIG. 16 is a flowchart illustrating an example of a process performed by a first queue monitoring process.

FIG. 16 is a flowchart illustrating an example of a process performed by the first queue monitoring process 45. The process will now be described in detail with reference to FIG. 16.

Referring to FIG. 16, in Step S61, the first queue monitoring process 45 determines the destination of the normal message by the autonomous load sharing and transfers the normal message to the determined destination. In Step S62, the first queue monitoring process 45 stores the delivery state management information about the normal message in the message delivery state manager 44. At this time, the delivery state in the delivery state management information is set to the state in which the reception of a message (notification) is waited for. In Step S63, the first queue monitoring process 45 deletes the first queue monitoring process 45 itself. Then, the process in FIG. 16 is terminated.

The determination steps S42, S47, S49, S51, S53, and S54 in the flowchart in FIG. 15 correspond to the steps realizing the MSG allocator 33b in each protocol-message processing unit 33. The MSG allocator 33b stores only the messages to be transferred by the second queue monitoring process 45 in the message queue 41.

Figure 17:
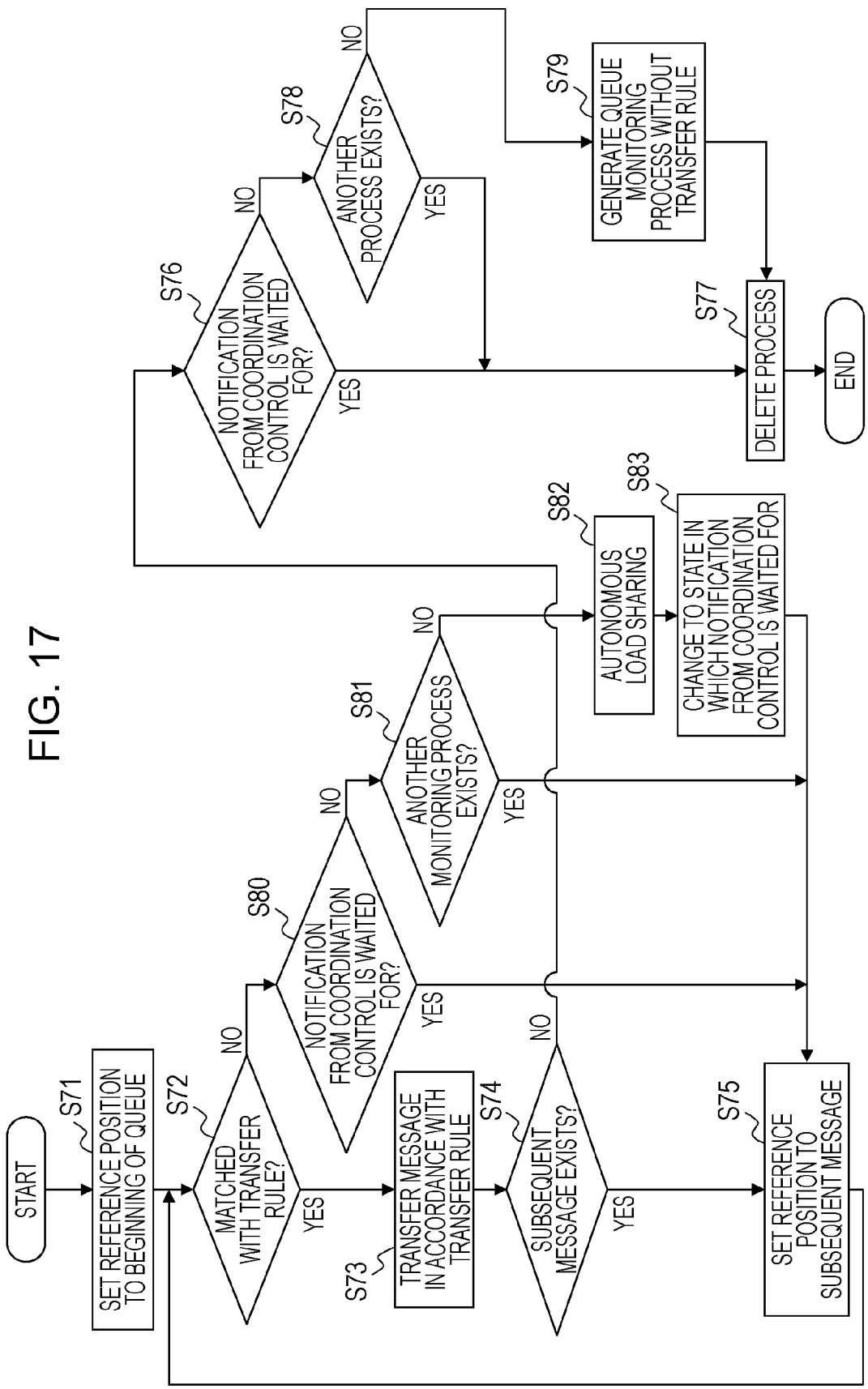
FIG. 17 is a flowchart illustrating an example of a process performed by a second queue monitoring process.

FIG. 17 is a flowchart illustrating an example of a process performed by the second queue monitoring process 45. The process will now be described in detail with reference to FIG. 17. The uniqueness assurance information assigned to the second queue monitoring process 45 is denoted by the "transfer rule" in FIG. 17.

Referring to FIG. 17, in Step S71, the second queue monitoring process 45 sets the reference position of the message queue 41 to the beginning thereof. In Step S72, the second queue monitoring process 45 determines whether the message at the reference position is matched with the transfer rule. If the same session identifier as that in the transfer rule is stored in the message, the determination is affirmative and the process goes to Step S73. If the same session identifier as that in the transfer rule is not stored in the message, the determination is negative and the process goes to Step S80.

In Step S73, the second queue monitoring process 45 transfers the message at the reference position in accordance with the transfer rule. In Step S74, the second queue monitoring process 45 determines whether a subsequent message exists. If the second queue monitoring process 45 determines that a message exists at a position subsequent to the reference position, the determination is affirmative and the process goes to Step S75. In Step S75, the second queue monitoring process 45 sets the reference position to the position of the subsequent message and the process goes back to Step S72. If the second queue monitoring process 45 determines that no subsequent message exists, that is, if all the messages in the message queue 41 have been referred to, the determination in Step S74 is negative and the process goes to Step S76.

In Step S76, the second queue monitoring process 45 determines whether a notification from the uniqueness-assurance-information setting and managing apparatus 15 (coordination control) is waited for. If the delivery state management information having the delivery state in which the reception of a message is waited for is stored in the message delivery state manager 44, the determination is affirmative and the process goes to Step S77. In Step S77, the second queue monitoring process 45 deletes the second queue monitoring process 45 itself. Then, the process in FIG. 17 is terminated. If the delivery state management information having the delivery state in which the reception of a message is waited for is not stored in the message delivery state manager 44, the determination in Step S76 is negative and the process goes to Step S78.

In Step S78, the second queue monitoring process 45 determines whether another second queue monitoring process 45 exists. If the queue monitoring process 45 determines that another second queue monitoring process 45 exists, the determination is affirmative and the process goes to Step S77. In Step S77, the second queue monitoring process 45 deletes the second queue monitoring process 45 itself. If the second queue monitoring process 45 determines that another second queue monitoring process 45 does not exist, the determination in Step S78 is negative and the process goes to Step S79. In Step S79, the second queue monitoring process 45 generates the first queue monitoring process 45. Then, the process goes to Step S77.

If the second queue monitoring process 45 determines in Step S72 that the message at the reference position is not matched with the transfer rule, that is, that the same session identifier as that in the transfer rule is not stored in the message, then in Step S80, the second queue monitoring process 45 determines whether a notification from the uniqueness-assurance-information setting and managing apparatus 15 (coordination control) is waited for. If the delivery state management information having the delivery state in which the reception of a message is waited for is stored in the message delivery state manager 44, the determination is affirmative and the process goes to Step S75. If the delivery state management information having the delivery state in which the reception of a message is waited for is not stored in the message delivery state manager 44, the determination in Step S80 is negative and the process goes to Step S81.

In Step S81, the second queue monitoring process 45 determines whether another second queue monitoring process 45 exists. If the second queue monitoring process 45 determines that another second queue monitoring process 45 exists, the determination is affirmative and the process goes to Step S75. If the second queue monitoring process 45 determines that another second queue monitoring process 45 does not exist, the determination in Step S81 is negative and the process goes to Step S82.

In Step S82, the second queue monitoring process 45 transfers the message at the reference position by the autonomous load sharing. In Step S83, the second queue monitoring process 45 stores the delivery state management information about this message in the message delivery state manager 44. At this time, the delivery state in the delivery state management information is set to the state in which the reception of a message (notification) is waited for. Then, the process goes to Step S75.

In the first embodiment, the second queue monitoring process 45 also performs the autonomous load sharing in the above manner. Accordingly, in the example in FIG. 15, the normal message for which the autonomous load sharing is not performed, that is, the normal message the determination of which in Step S53 is affirmative is stored in the message queue 41 in the situation in which the second queue monitoring process 45 exists. This causes the autonomous load sharing by the first queue monitoring process 45 to be performed for only the messages that are not supported by the second queue monitoring process 45. This is because the second queue monitoring process 45 is generated as the result of the autonomous load sharing. In other words, it is necessary to make a trigger for the generation of the second queue monitoring process 45. Accordingly, the queue monitoring process generator 43 generates the first queue monitoring process 45 only at predetermined timing, for example, when the secondary SLB 14 is activated.

Figure 18:
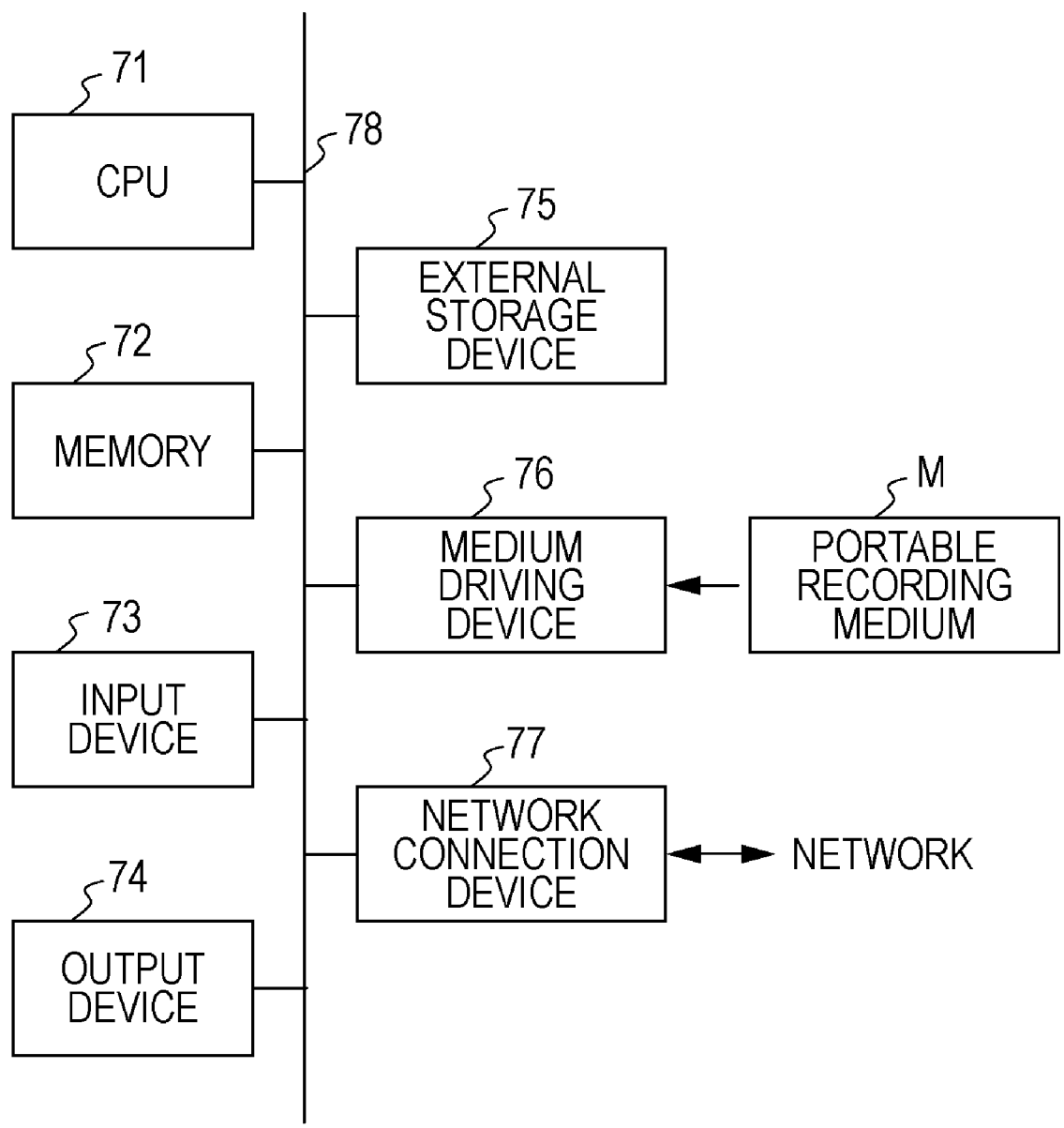
FIG. 18 illustrates an example of the hardware configuration of a computer to which the first embodiment is applicable.

FIG. 18 illustrates an example of the hardware configuration of a computer to which the first embodiment is applicable. The configuration of a computer that can be used as the secondary SLB 14, that is, a computer capable of realizing the secondary SLB 14 by executing the uniqueness assurance assisting program will now be specifically described with reference to FIG. 18.

The computer illustrated in FIG. 18 has a configuration in which a CPU 71, a memory 72, an input device 73, an output device 74, an external storage device 75, a medium driving device 76, and a network connection device 77 are connected to each other via a bus 78. The configuration illustrated in FIG. 18 is only an example and the configuration of the computer is not restricted to the one illustrated in FIG. 18.

The CPU 71 controls the entire computer. The memory 72 temporarily stores a program and/or data stored in the external storage device 75 (or a portable recording medium M) in execution of the program or update of the data. The CPU 71 reads out the program in the memory 72 and executes the readout program to control the entire computer.

The input device 73 is, for example, an interface connected to an operation device including a keyboard and a mouse. The input device 73 detects a user's operation with the operation device and notifies the CPU 71 of the result of the detection.

The output device 74 is, for example, a display control device connected to a display device. The network connection device 77 performs communication with, for example, the presence servers 11 and the primary SLBs 13 over a communication network. The external storage device 75 is, for example, a hard disk. The external storage device 75 is mainly used for storage of a variety of data and programs.

The medium driving device 76 accesses the portable recording medium M, such as an optical disk or a magneto-optical disk.

The uniqueness assurance assisting program is stored in the external storage device 75 or the portable recording medium M or is acquired by the network connection device 77 over the communication network. The management program for the uniqueness assurance assisting program is read out in the memory 72 and is executed by the CPU 71 to realize the secondary SLB 14.

In the configuration illustrated in FIG. 3, for example, the message-from-client receiver 31, the message-from-client transmitter 34, the message-from-server receiver 35, the message-from-server transmitter 38, and the uniqueness-assurance-information related notification acceptor 39 are realized by the network connection device 77, the CPU 71, the memory 72, the external storage device 75, and the bus 78. The message queue 41, the queue monitoring process manager 42, and the message delivery state manager 44 correspond to, for example, the memory 72. The uniqueness assurance DB 301 and the uniqueness-assurance-information identification rule 303 are stored in, for example, the external storage device 75 or the portable recording medium M and all or part of them is read out in the memory 72, if necessary. For example, the message identifier 32, the message identifier 36, each protocol-message processing unit 33, each protocol-message processing unit 37, and the queue monitoring process generator 43 are realized by the CPU 71, the memory 72, the external storage device 75, and the bus 78.

The secondary SLB 14 is provided separately from the primary SLBs 13 in the first embodiment because the primary SLBs 13 are provided for the respective communication protocols. Instead of the two primary SLBs 13, one secondary SLB 14 may be used. Accordingly, the uniqueness assurance assisting apparatus according to the first embodiment may be installed in the primary SLB 13.

Second Embodiment

In the first embodiment described above, all the messages the uniqueness assurance information about which is not registered in the uniqueness assurance table are transferred to the server through the secondary SLB 14. Accordingly, since the messages that can be allocated in the primary SLB 13 not through the secondary SLB 14 are processed through the secondary SLB 14, there is a problem in that the processing load on the secondary SLB 14 can be increased.

Accordingly, in a system according to a second embodiment of the present invention, the messages that can be processed not through the secondary SLB 14 are processed in the primary SLB 13.

Since most of the configuration in the second embodiment is the same as that in the first embodiment, the same reference numerals are used in the second embodiment to identify the same functions as in the first embodiment. A description of such functions is omitted herein.

In the second embodiment, the primary SLB 13 determines whether the primary SLB 13 can allocate a message or whether the primary SLB 13 causes the secondary SLB 14 to determine a server to which the message is allocated in the following manner.

Basically, as in the first embodiment, the primary SLB 13 causes the secondary SLB 14 to determine a server to which the message is allocated. The reason for why the primary SLB 13 does not determine a server to which the message is allocated is because, if a subsequent message of the same session reaches another primary SLB 13 before the uniqueness assurance information is registered in the primary SLB 13 for each communication protocol since the first message has reached the primary SLB 13 for a communication protocol, the other primary SLB 13 allocates the message to a server different from the server to which the first message is allocated, thus preventing the uniqueness from being ensured.

However, a server to which the message is allocated can be determined in the primary SLB 13 in the following case. When the server that has received the first message creates a session and issues the session identifier, the client can transmit a subsequent message only after the client receives a reply to the first message from the server to know the session identifier from the reply. Accordingly, the subsequent message does not arrive from the client before the uniqueness assurance information is registered in the primary SLB 13 for each communication protocol since the client has transmitted the first message. Consequently, the primary SLB 13 determines that the primary SLB 13 can determine the server to which the message is allocated without using the secondary SLB 14 if the message includes no session identifier. When the primary SLB 13 determines that the primary SLB 13 can determine the server to which the message is allocated, the primary SLB 13 determines the server to which the message is allocated and does not transfer the message to the secondary SLB 14. As a result, it is possible to reduce the processing load on the secondary SLB 14.

Figure 19:
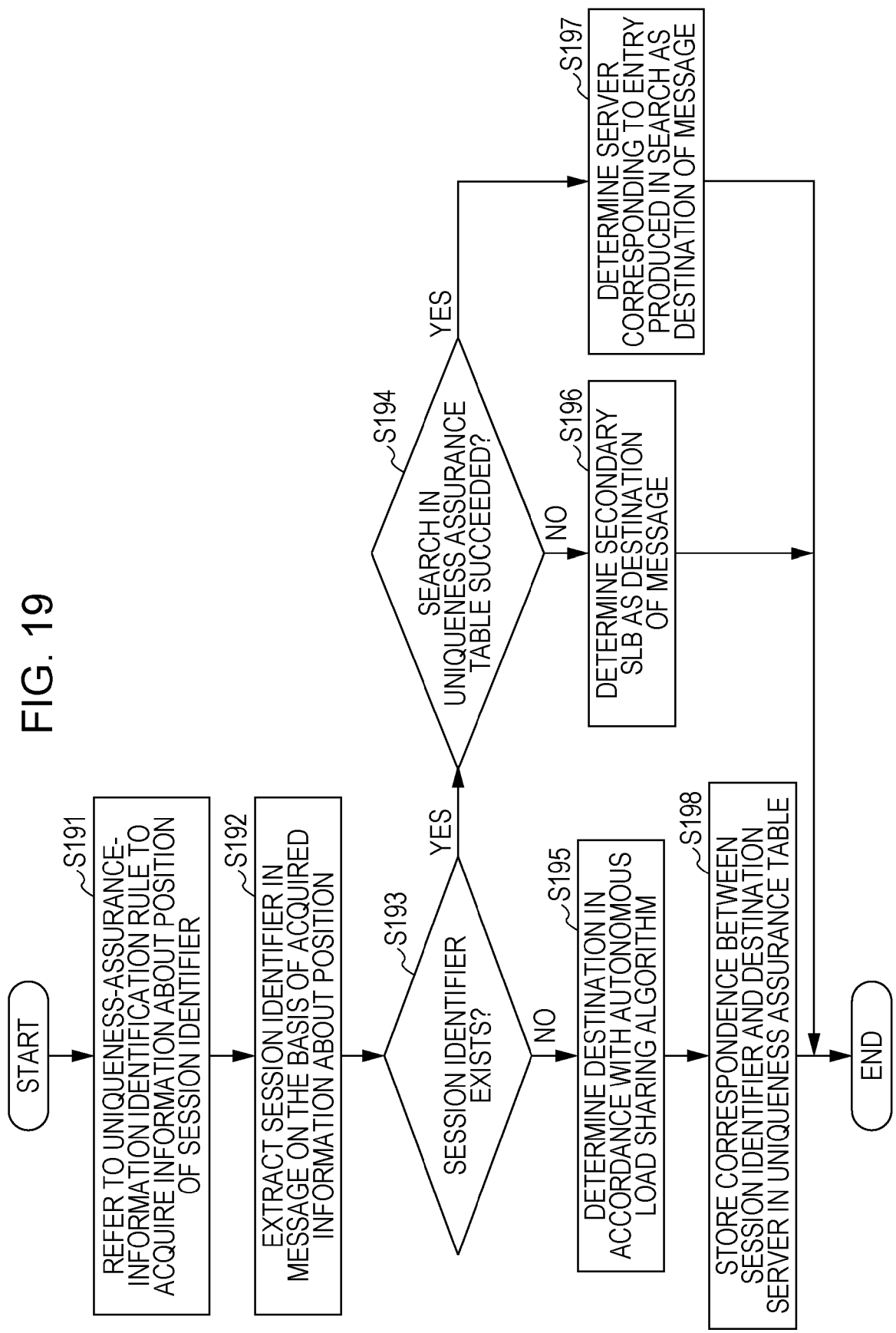
FIG. 19 is a flowchart illustrating an example of a process performed by a protocol-message processing unit in the primary SLB according to a second embodiment of the present invention.

The protocol-message processing unit 23 in the primary SLB 13 (refer to FIG. 2) performs a process illustrated in a flowchart in FIG. 19 in order to perform the above processing in the primary SLB 13.

It is assumed here that the uniqueness assurance information is the transfer rule for transferring a message from the client to the server to which the message should be transferred and includes, for example, at least one pair of the session identifier and the destination to which the message is transferred and which corresponds to the session identifier, as in the first embodiment. The uniqueness assurance information is registered in the uniqueness assurance table for management.

Referring to FIG. 19, in Step S191, the protocol-message processing unit 23 refers to the uniqueness-assurance-information identification rule 203 to acquire information about the position of the session identifier. In Step S192, the protocol-message processing unit 23 extracts the session identifier in the message on the basis of the acquired information about the position.

In Step S193, the protocol-message processing unit 23 determines whether the session identifier exists in the message. If the protocol-message processing unit 23 determines that the session identifier exists in the message, the process goes to Step S194. If the protocol-message processing unit 23 determines that the session identifier does not exist in the message, the process goes to Step S195.

In Step S195, the protocol-message processing unit 23 determines the server to which the message is transferred (the destination server) in accordance with the autonomous load sharing algorithm, such as the round robin method. In Step S198, the protocol-message processing unit 23 stores the correspondence between the session identifier and the destination server (the uniqueness assurance information) in the protocol-message uniqueness assurance table 202.

If the protocol-message processing unit 23 determines in Step S193 that the session identifier exists in the message, then in Step S194, the protocol-message processing unit 23 searches the protocol-message uniqueness assurance table 202 by using a virtual Internet Protocol (IP) address of the application to which the message is allocated and the session identifier as keys. If a destination IP address and the session identifier are registered in the protocol-message uniqueness assurance table 202 (the search in the protocol-message uniqueness assurance table 202 succeeded), the process goes to Step S197. If the search in the protocol-message uniqueness assurance table 202 did not succeed, the process goes to Step 196.

In Step S197, the protocol-message processing unit 23 determines the server corresponding to the session identifier that is found to be registered in the protocol-message uniqueness assurance table 202 as the destination of the message. In Step S196, the protocol-message processing unit 23 determines the secondary SLB 14 as the destination of the message.

Of the steps in the flowchart in FIG. 19, Steps S191, S192, and S193 are performed by the uniqueness-assurance-information identifier 23a, Steps S194, S195, S196, and S197 are performed by the MSG allocator 23b, and Step S198 is performed by the uniqueness-assurance-information recorder 23c.

The operation etc. of a service providing system according to the second embodiment will be specifically described in detail.

Figure 20:
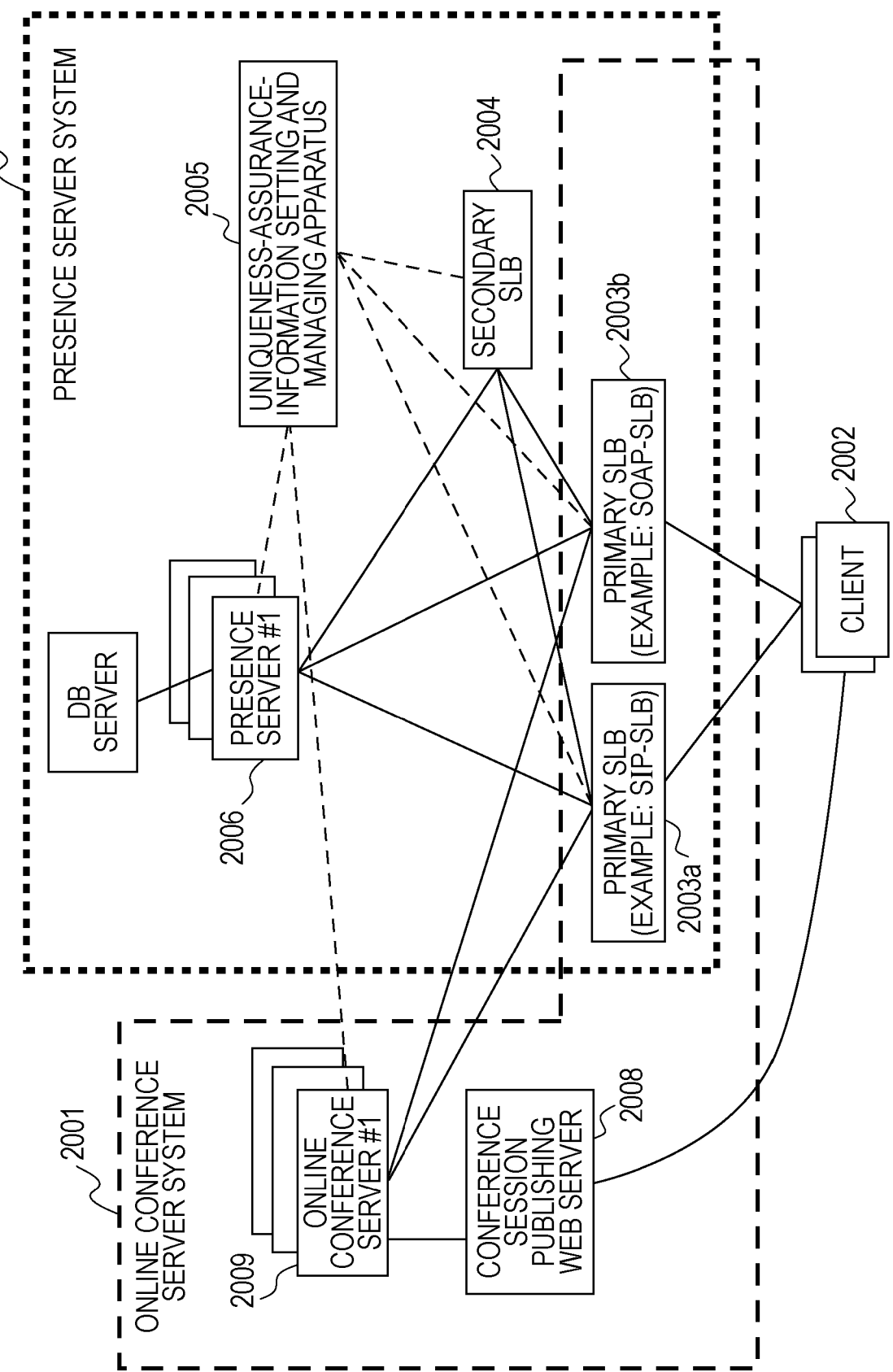
FIG. 20 illustrates an example of the configuration of a service providing system according to the second embodiment of the present invention.

FIG. 20 illustrates an example of the configuration of the service providing system providing services in accordance with multiple different communication protocols. The service providing system according to the second embodiment in FIG. 20 includes two services of an online conference server system and a presence server system.

The service providing system in FIG. 20 has a configuration in which a presence server system 2000, an online conference server system 2001, a primary SLB 2003, a secondary SLB 2004, each client 2002, and a uniqueness-assurance-information setting and managing apparatus 2005 are connected to each other over a network.

The presence server system 2000 and the online conference server system 2001, which are two kinds of server systems in FIG. 20, will now be described.

The presence server system 2000 provides to a user of each client 2002 a presence service that provides presence information indicating the state of a target person, as in the first embodiment. The state of a target person indicates, for example, whether the person is present, whether the person is on the phone, or whether the person is busy.

It is assumed that a service providing application (hereinafter referred to as an "application #1") installed in each presence server 2006 supports the SIP and the SOAP as the communication protocols.

The client 2002 that intends to use the application in the presence server system 2000, that is, the application #1 specifies a destination using the SIP-URI. This SIP-URI can be acquired by the user of the client 2002 in advance by an arbitrary method, such as a verbal notice from a user of the destination. Accordingly, the client 2002 can transmit the following message for which the SIP-URI of the destination is specified in accordance with the SIP or the SOAP without waiting for a reply to a message that has been transmitted in accordance with a communication protocol (for example, the SIP).

FIGS. 21A and 21B illustrate examples of the formats of messages when the application #1 is used. The session identifier is the SIP-URI of the client that is the destination of the client that has transmitted the message. In an SIP message in FIG. 21A, the session identifier is stored in a "To" field in the header. In a SOAP message in FIG. 21B, the session identifier is stored as a "presentity" parameter in the body. The server that has received the first message creates a session and, then, registers the uniqueness assurance information in the uniqueness assurance tables in a primary SLB (SIP-SLB) 2003a and a primary SLB (SOAP-SLB) 2003b through the uniqueness-assurance-information setting and managing apparatus 2005.

The online conference server system 2001 provides an online conference service to the user of the client 2002.

It is assumed that a service providing application (hereinafter referred to as an "application #2") installed in each online conference server 2009 supports the SIP and the SOAP as the communication protocols.

Unlike the case of the application #1, the client 2002 can transmit a subsequent message only after the client 2002 transmits a conference-session creation request message in accordance with a communication protocol (the SOAP here) and receives a reply to the request message to accept the session identifier (session-id) for identifying the conference session. Specifically, for example, the client 2002 operates in the following manner. First, the client 2002 that has created an online conference room transmits the conference-session creation request including the name of the conference room as a parameter in accordance with the SOAP to the online conference server 2009. Since a conference session is to be created from now on, the session identifier in the message is null. Next, the online conference server 2009 creates a conference session (the entity of it is a call control instance in the server) in response to the reception of the conference-session creation request message and issues the session identifier. In addition, the online conference server 2009 registers the uniqueness assurance information in the primary SLB (SIP-SLB) 2003a and the primary SLB (SOAP-SLB) 2003b through the uniqueness-assurance-information setting and managing apparatus 2005 and, then, returns a reply including the session identifier to the client 2002. Then, the online conference server 2009 notifies a conference session publishing Web server (hereinafter referred to as a "Web server") 2008 of a pair of the name of the conference room and the session identifier, and the Web server 2008 publishes the name of the conference room for which the session identifier is issued on the Web. The client 2002 that intends to participate in the conference room acquires the session identifier from the SOAP reply message or refers to the information published by the Web server 2008 to acquire the session identifier corresponding to the name of the target conference room. Then, the client 2002 stores the acquired session identifier in an SIP message (described below with reference to FIGS. 22A and 22B) and transmits the SIP message to the online conference server 2009 as a conference room participation request message.

FIGS. 22A and 22B illustrate examples of the formats of messages when the application #2 is used. The session identifier is the session identifier (session-id) of the conference session. In an SIP message in FIG. 22A, the session identifier is stored in a "Join" field in the header. In a SOAP message in FIG. 22B, the session identifier is stored as a "session-id" parameter in the body.

The two kinds of servers described above (the presence server 2006 and the online conference server 2009) are configured by providing the applications to be allocated in multiple servers. The primary SLB (SIP-SLB) 2003a and the primary SLB (SOAP-SLB) 2003b virtualize the applications #1 and #2 provided on the multiple servers for the client 2002. Specifically, for example, virtual IP#1_sip and virtual IP#1_soap for the respective protocols are assigned to the application #1. The client 2002 that intends to access the application #1 transmits messages to these virtual IP addresses. Similarly, virtual IP#2_sip and virtual IP#2_soap are assigned to the application #2. The client 2002 that intends to access the application #2 transmits messages to these virtual IP addresses. The primary SLB (SIP-SLB) 2003a and the primary SLB (SOAP-SLB) 2003b determine whether the destination application is the application #1 or the application #2 on the basis of the destination IP address of the message.

The operation of the service providing system illustrated in FIG. 20 will now be described in the following order:

A) Static setting before the operation

B) Allocating operation during the operation (when the client connects to the application #1)

C) Allocating operation during the operation (when the client connects to the application #2)

A) Static Setting Before the Operation

First, the virtual IP address for every server system is set in the primary SLBs 2003. In the service providing system illustrated in FIG. 20, the primary SLB (SIP-SLB) 2003a sets the virtual IP address of the application #1 to the virtual IP#1_sip and the virtual IP address of the application #2 to the virtual IP#2_sip, and the primary SLB (SOAP-SLB) 2003b sets the virtual IP address of the application #1 to the virtual IP#1_soap and the virtual IP address of the application #2 to the virtual IP#2_soap.

Next, the uniqueness-assurance-information identification rule 203 is set. FIG. 23 illustrates an example of the uniqueness-assurance-information identification rule 203 in the service providing system illustrated in FIG. 20. In the example in FIG. 23, information about the kinds of protocols, the message types (virtual IP addresses), and the positions of the session identifiers is registered in a table for management. The relationship between the virtual IP address of the application to which the message is allocated and the position of the session identifier in the message is set on the basis of the uniqueness-assurance-information identification rule 203.

In addition, allocation destination candidate server IP addresses included in the autonomous load sharing algorithm in the MSG allocator 23b are set. FIG. 24 illustrates an example of how to set the allocation destination candidate server IP addresses. A list of the virtual IP addresses of applications to which messages are allocated and the IP addresses of the allocation destination candidate servers is set.

B) Allocating Operation During the Operation (when the Client Connects to the Application #1)

It is assumed that the client 2002 substantially concurrently transmits an SIP message and a SOAP message including alice@ps.com as the session identifier (session-id) to the virtual IP#1_sip and the virtual IP#1_soap, respectively, in a state in which the uniqueness assurance information having alice@ps.com as the session identifier (session-id) is not registered in the protocol-message uniqueness assurance table 202.

The protocol-message processing unit 23 in each of the primary SLBs 13, that is, the primary SLB (SIP-SLB) 2003a and the primary SLB (SOAP-SLB) 2003b that have received the messages including the session identifier from the client 2002 performs the following processing in accordance with the flowchart illustrated in FIG. 19.

The uniqueness-assurance-information identifier 23a refers to the uniqueness-assurance-information identification rule 203 (FIG. 23) to identify the positions of the session identifiers concerning the messages to the above virtual IP addresses in order to extract the session identifier in each message. The example in FIG. 23 indicates that the session identifier exists in the To field in the message to the virtual IP#1_sip and the session identifier is stored as the presentity parameter in the message to the virtual IP#1_soap. The session identifier is extracted from the information about the position where the session identifier exists (Steps S191 and S192 in FIG. 19).

Next, as described above in Step S193, it is determined whether the session identifier exists. Since alice@ps.com is stored as the session identifier in this case, the process goes to Step S194.

The MSG allocator 23b searches the protocol-message uniqueness assurance table 202 by using the virtual IP address and the extracted session identifier as keys in Step S194. FIG. 25A illustrates an example of the protocol-message uniqueness assurance table 202 in this case. The protocol-message uniqueness assurance table 202 is used to manage the uniqueness assurance information including the virtual IP address of each destination application, the session identifier, and the IP address of the server. Since data including the session identifier, alice@ps.com, does not exist in the protocol-message uniqueness assurance table 202 in FIG. 25A, the search failed. Accordingly, the process goes from Step S194 to Step S196 to determine the secondary SLB 2004 as the destination of the message.

After the primary SLB 2003 operates in the above manner, the secondary SLB 2004 allocates the message transferred from the primary SLB 2003. The presence server 2006 that has received the message from the secondary SLB 2004 creates a session and, then, registers the uniqueness assurance information in the protocol-message uniqueness assurance table 202 in each primary SLB 2003 through the uniqueness-assurance-information setting and managing apparatus 2005.

The above operation enables the uniqueness assurance using the secondary SLB 2004 even if the client 2002 substantially concurrently transmits messages in accordance with different communication protocols.

C) Allocating Operation During the Operation (when the Client Connects to the Application #2)

It is assumed that the client 2002 transmits the first message in accordance with the SOAP, in which the session identifier is set to null, to the virtual IP#2_soap. The client 2002 can transmit a subsequent message only after a reply including the session identifier is received.

The protocol-message processing unit 23 in the primary SLB 13, that is, the primary SLB (SOAP-SLB) 2003b that has received the message that does not include the session identifier from the client 2002 performs the following processing in accordance with the flowchart illustrated in FIG. 19.

First, the uniqueness-assurance-information identifier 23a refers to the uniqueness-assurance-information identification rule 203 (FIG. 23) to identify the position of the session identifier concerning the message to the virtual IP#2_soap in order to extract the session identifier in the message. Since the session identifier is not stored in this case, the process goes to Step S195 through Steps S191, S192, and S193.

Next, the MSG allocator 23b determines the destination server in accordance with any autonomous load sharing algorithm (Step S195 in FIG. 19). For example, the uniqueness-assurance-information identification rule 203 is referred to by using the virtual IP#2_soap in the table illustrated in FIG. 24 as a key to acquire allocation destination candidate server IP addresses and determines one destination server by the round robin algorithm.

Then, the uniqueness-assurance-information recorder 23c stores the correspondence between the session identifier and the destination server in the protocol-message uniqueness assurance table 202 in the uniqueness assurance DB 201 in each primary SLB 2003 (Step S198 in FIG. 19).

After the above processing is performed, the primary SLB (SOAP-SLB) 2003b transfers the message to the online conference server 2009 determined to be the allocation destination.

The online conference server 2009 that has received the message from the primary SLB (SOAP-SLB) 2003b creates a session and registers the uniqueness assurance information including the virtual IP address of the destination application, the session identifier (0123@kaigi.com) of the created session, and the IP address of the server in the protocol-message uniqueness assurance table 202 in each primary SLB 2003 through the uniqueness-assurance-information setting and managing apparatus 2005. FIG. 25B illustrates an example of the protocol-message uniqueness assurance table 202 when the uniqueness assurance information is registered. Although the protocol-message uniqueness assurance table 202 in FIG. 25B may be divided for every protocol or message type, one protocol-message uniqueness assurance table 202 is used here for convenience. Then, the online conference server 2009 returns a reply including 0123@kaigi.com as the session identifier to the client 2002 and registers a pair of the name of the conference room and the session identifier (session-id=0123@kaigi.com) in the Web server 2008.

Then, the client 2002 transmits an SIP INVITE message including 0123@kaigi.com as the session identifier (session-id) to the virtual IP#2_sip to participate in the conference session. At this time, the protocol-message processing unit 23 in the primary SLB 2003, that is, the primary SLB (SIP-SLB) 2003a performs the following processing in accordance with the flowchart illustrated in FIG. 19.

First, the uniqueness-assurance-information identifier 23a refers to the uniqueness-assurance-information identification rule 203 (FIG. 23) to identify the position of the session identifier concerning the message to the virtual IP#2_sip in order to extract the session identifier in the message. Since 0123@kaigi.com is extracted as the session identifier, the process goes to Step S194 through Steps S191, S192, and S193.

Next, the MSG allocator 23b searches the protocol-message uniqueness assurance table 202 by using the virtual IP#2_sip and the session identifier 0123@kaigi.com as keys (Step S194 in FIG. 19). Since the protocol-message uniqueness assurance table 202 is in the state illustrated in FIG. 25B, the search produces a server having an IP address "IP address #4" and the server is determined to be the destination server (Step S197 in FIG. 19).

Then, the primary SLB (SIP-SLB) 2003a transfers the message to the determined online conference server 2009.

As described above, the uniqueness assurance can be realized for the messages whose allocation destination servers can be determined in the primary SLB for every protocol without using the secondary SLB. Accordingly, it is possible to reduce the amount of traffic on the communication path for the secondary SLB and to reduce the processing load on the secondary SLB, compared with the case in which all the messages whose session identifiers are not registered in the uniqueness assurance table are transferred to the secondary SLB.

Although the configuration of the system including the online conference server system and the presence server system, which is the service system providing services using multiple communication protocols, is described in the above second embodiment, other systems providing services in accordance with other protocols may be adopted.

Since the hardware configuration of a computer to which the second embodiment is applicable is the same as that illustrated in FIG. 18, a detailed description of the hardware configuration of the computer is omitted herein. Specifically, a program operating in accordance with the flowchart in FIG. 19 is stored in the memory 72, the external storage device 75, or the like and is executed by the CPU 71 to realize the second embodiment.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present inventions has been described in detail, it should be understood that the various changes, substitutions, and alterations could be made hereto without departing from the spirit and scope of the invention.

What is claimed is:

1. A non-transitory computer-readable recording medium storing a uniqueness assurance assisting program that causes a computer assisting uniqueness assurance by a load sharing apparatus to perform:

a message acquiring function to acquire messages, for which a destination server is not determined, received from a terminal apparatus by the load sharing apparatus;

a message transferring function to refer to uniqueness assurance information that is stored in a storage apparatus and that indicates a correspondence between a received message and identification information about a session created by a destination server to which the received message should be transferred, and to transfer the received message, for which the destination server is identified by the uniqueness assurance information, among the messages acquired by the message acquiring function, to the destination server;

an autonomous load sharing function to select a destination server to which a message that is not transferred by the message transferring function, among the messages acquired by the message acquiring function, should be transferred from multiple servers to transfer the message to the selected destination server; and an information managing function to store new uniqueness assurance information, which is generated for a new session created in the selected destination server, for plural communication protocols in the storage apparatus, wherein the terminal apparatus stores message identification information in a first message and a second message, and transmits the first and second messages via different ones of multiple communication protocols, and wherein the second message is stored after the message transferring function recognizes the message identification information stored in the second message as being the same as the message identification information stored in the first message.

2. A method of realizing uniqueness assurance corresponding to coordination between multiple communication protocols in transfer of a message transmitted from a terminal apparatus to one server among multiple servers capable of providing services in accordance with the multiple communication protocols by a load sharing apparatus, the method comprising the steps of:

selecting a server to which a first message, whose destination server is not determined, is to be transferred from the multiple servers, and transferring the first message to the selected server when the first message is received from the terminal apparatus by the load sharing apparatus;

storing a second message that should be transferred to the selected server when the second message is received from the terminal apparatus by the load sharing apparatus after the first message is transferred;

generating uniqueness assurance information corresponding to the communication protocols for a session generated by the selected server to which the first message is transferred, the uniqueness assurance information indicating a correspondence between the session and messages corresponding to the session; and transferring the second message in accordance with the generated uniqueness assurance information if the stored second message exits, wherein the terminal apparatus stores identification information in the first and second messages and transmits the first and second messages via different ones of the multiple communication protocols; and wherein the storing step is performed after recognizing the identification information stored in the second message as being the same as the identification information stored in the first message.

3. A non-transitory computer-readable recording medium storing a program that causes a computer composing a first load sharing apparatus that determines a destination server, from servers providing services, in accordance with multiple communication protocols, to which a message received from a terminal apparatus should be transferred, to execute the steps of:

determining whether the received message includes a session identifier;

determining the destination server of the message by an autonomous load sharing algorithm if it is determined that the message does not include a session identifier; and determining whether uniqueness assurance information corresponding to the message is registered in a uniqueness assurance table if it is determined that the message includes a session identifier to determine the destination server of the message in accordance with the corresponding uniqueness assurance information if the uniqueness assurance information corresponding to the message is registered in the uniqueness assurance table, and to transfer the message to a second load sharing apparatus if the uniqueness assurance information corresponding to the message is not registered in the uniqueness assurance table, wherein the terminal apparatus stores identification information in a first message and a second message, and transmits the first and second messages via different ones of the multiple communication protocols, and wherein the first load sharing apparatus stores the second message after the second message is received from the terminal apparatus and the identification information stored in the second message is recognized as being the same as the identification information stored in the first message.

4. The computer-readable storage medium according to claim 3, wherein the second load sharing apparatus determines the destination server of a message transferred from the first load sharing apparatus to transfer the message to the determined server and, if a message that should be transferred to the same server as that of the transferred message is later received, the message is queued until the corresponding uniqueness assurance information is registered in the uniqueness assurance table.

5. A method of determining a destination of a message in a first load sharing apparatus that determines a destination server, to which a message received from a terminal apparatus should be transferred, from servers providing services in accordance with multiple communication protocols, the method comprising the steps of:

determining whether the received message includes a session identifier;

determining the destination server of the message by an autonomous load sharing algorithm if it is determined that the message does not include a session identifier; and determining whether uniqueness assurance information corresponding to the message is registered in a uniqueness assurance table if it is determined that the message includes a session identifier to determine the destination server of the message in accordance with the corresponding uniqueness assurance information if the uniqueness assurance information corresponding to the message is registered in the uniqueness assurance table, and to transfer the message to a second load sharing apparatus if the uniqueness assurance information corresponding to the message is not registered in the uniqueness assurance table, wherein the terminal apparatus stores identification information in a first message and a second message, and transmits the first and second messages via different ones of the multiple communication protocols, and wherein the first load sharing apparatus stores the second message after the second message is received from the terminal apparatus and the identification information stored in the second message is recognized as being the same as the identification information stored in the first message.

6. The method of determining a destination of a message according to claim 5, wherein the second load sharing apparatus determines the destination server of a message transferred from the first load sharing apparatus to transfer the message to the determined server and, if a message that should be transferred to the same server as that of the transferred message is later received, the message is queued until the corresponding uniqueness assurance information is registered in the uniqueness assurance table.

* * * * *